United States Patent [19]

Foulkes

[11] 4,051,876
[45] *Oct. 4, 1977

[54] MANUFACTURE OF TUBULAR TYPE BATTERY PLATES

[75] Inventor: Stanley Charles Foulkes, Deane, England

[73] Assignee: Chloride Group Limited, London, England

[*] Notice: The portion of the term of this patent subsequent to May 3, 1994, has been disclaimed.

[21] Appl. No.: 642,734

[22] Filed: Dec. 22, 1975

[30] Foreign Application Priority Data

Dec. 23, 1974 United Kingdom ............... 40952/74
Oct. 15, 1975 United Kingdom ............... 42361/75

[51] Int. Cl.$^2$ .............................................. B65B 1/04
[52] U.S. Cl. ..................................... 141/1.1; 429/209
[58] Field of Search ..................... 136/86 A, 43, 120; 141/1.1; 429/209

[56] References Cited

U.S. PATENT DOCUMENTS

| | | | |
|---|---|---|---|
| 3,056,849 | 10/1962 | Warren et al. | 136/120 R |
| 3,207,632 | 9/1965 | Dickover et al. | 136/43 |
| 3,393,096 | 7/1968 | Jost | 136/120 R |
| 3,615,834 | 10/1971 | Sundberg | 136/43 |

Primary Examiner—John H. Mack
Assistant Examiner—H. A. Feeley
Attorney, Agent, or Firm—Oblon, Fisher, Spivak, McClelland & Maier

[57] ABSTRACT

There is disclosed a method for preparing enveloped plates for batteries by introducing an active material composition containing liquids into the porous envelope of the plate, when the envelope is assembled on the current conducting element of the plate, the active material composition being an alkaline active material composition with a liquid content such that active material is filtered out by the porous envelope, while liquids pass out through the walls of the porous envelope.

There is also disclosed a novel alkaline electric storage battery electrode comprising a porous envelope enclosing within it particulate active material which is electrochemically active under alkaline conditions, the porous envelope being one which is capable of filtering out a bed of active material from an aqueous slurry of the active material containing 0.5 parts of the active material per part of water.

11 Claims, 15 Drawing Figures

MANUFACTURE OF TUBULAR TYPE BATTERY PLATES

BACKGROUND OF THE INVENTION

The present invention relates to novel methods of making alkaline electric storage batteries and to novel electrode structures therefor.

The conventional method of making an alkaline storage battery, for example having a nickel positive and a cadmium negative is to form a perforated steel sheet having perforations 0.008 to 0.010 inches in diameter into a narrow channel section, a briquette of positive or negative active material made by compressing the active material powder is then inserted into the channel and a further sheet of perforated steel placed over the assembly and crimped round the edge of the assembly to close it. The channel strip is then cut to length and joined side by side to other strips to build up the necessary cell size. The assembly is then welded into a steel mesh container and current collectors attached.

This is a multistep process and it would be desirable if it could be simplified. In addition the use of dry powders introduces considerable handling problems.

We have discovered that these problems can be considerably reduced by introducing the active material into modified and novel forms of the plates by a novel technique. These plates are enveloped plate preferably tubular plates.

Tubular plates can have a variety of different types of porous tube material and tube configurations and can have tubes joined together or formed as separate tubes which are separately located on the current collecting elements of the cell.

One example of such separate tube arrangements utilizes woven fabric tubes having a thin outer plastic sheath provided with perforations about 1 to 2 mm. across spaced apart by about 1 to 2 mms. The plastic sheath is about 0.1 to 0.2 mms thick.

SUMMARY OF THE INVENTION

The invention, though not limited to such arrangements, however, is described with particular reference to tube arrangements in which the tubes are a single preformed assembly since this facilitates assembly of the tubes on to the current collecting elements of the plate.

We have found that such enveloped or preferably tubular plate structures can be rapidly and evenly filled by introducing alkaline active materials into the tubes in the form of a pourable liquid slurry of very low viscosity which is poured or fed into the tubes under gravity and then, when the tubes are full, preferably consolidated by allowing the back pressure to build up. By controlling the value to which the back pressure is allowed to rise, the degree of consolidation can be varied as desired and a very even consolidation achieved.

According to one aspect of the present invention a method for preparing plates for alkaline batteries by introducing an active material composition into the porous envelope of the plate, is characterised by using alkaline active material composition with a water content such that active material is filtered out by the porous envelope, whilst liquids pass out through the walls of the porous envelope. Desirably the liquid content of the composition is such that a bed of active material is built up in the envelope, the bed building up from the end remote from that at which the composition is introduced back to the end at which the composition is introduced, liquid issuing through the walls of the envelope throughout the period that the bed is being built up. The active material is preferably a nickel positive active material or a cadmium negative active material and the ratio of solids to water in the composition is preferably from 3.0:1 or more down to preferably 0.1:1 by weight, 2.5:1 to 0.1:1 being preferred though ranges from 1/1 to 0.25:1 especially 0.75:1 down to 0.3:1 are most preferred.

With cadmium negative active materials we find that above about 0.8:1 e.g. at 0.96:1 the slurries are very thick and settle very little over 24 hours. Thus for filtration filling we prefer to use cadmium hydroxide slurries which will settle rapidly.

The term envelope covers arrays of separate tubes as well as arrays of tubes joined together or formed from sheets of material in addition to covering any envelope effective to form a bag or pocket around the current collecting element or elements of the plate and effective to filter out active material as a bed around the current conducting element or elements.

According to a preferred form of the present invention, a method of filling enveloped plates, preferably tubular plates, for alkaline batteries which comprises introducing an active material composition into the porous envelope of an enveloped plate e.g. the tubes, when the tubes are assembled on the current collecting element of the plate, e.g. the spines, is characterised in that the alkaline active material composition is fed into the envelope as an aqueous slurry when the envelope is disposed in a substantially vertical plane, preferably with the tubes vertical, so that the solids can settle to the bottom of envelope under the gravity, the aqueous slurry preferably containing a ratio of active material to water in the range 2.5:1 to 0.1:1 in parts by weight, the material of the envelope being selected to filter out active material whilst allowing passage of liquids, the solids thus being at least partially retained within the envelope and the liquids at least partially passing out through the walls of the envelope, and the introduction of the slurry into the envelope is continued until the envelope is filled with active material, the pressure in the supply to the envelope then being allowed to rise to a value above 5 psi but not in excess of 100 psi and the pressure thereafter being released.

For ease of description the process will be described essentially with reference to tubular plates.

The ratio of the volume of slurry which is fed into the tubes to the total internal free volume of the tubes in the plate is preferably at least 2:1 and desirably at least 3:1, 4:1 or 5:1 preferably 5:1 to 15:1 or more preferably 6:1 to 10:1.

The internal free volume of the tubes is that volume within the internal diameter of the tubes which is not occupied by the current collecting elements.

The aqueous slurry comprises a blend of water and particulate active material.

The weight ratio of solids to liquids in the slurry within the above defined range which is best used depends on the particular active material which is being used, and the permeability of the tubes which are being filled.

Preferably, the aqueous slurry comprises a blend of nickel hydroxide and graphite particulate active material and water in a weight ratio in the range 0.5:1 to 1.5:1 or cadmium hydroxide cadmium graphite mixtures and water in a weight ratio in the range 0.25:1 to 0.75:1.

The positive nickel active material may contain 80 to 90% nickel hydroxide and the balance graphite preferably as a blend of powdered graphite and flake graphite preferably in a 20:80 to 80:20 range of ratios by weight e.g. 66:34.

The negative cadmium active material preferably contains 70% to 90% cadmium hydroxide with up to 10% of cadmium e.g. 3 to 7%, up to 5% of graphite e.g. 1 to 3% and up to 5% of iron oxide e.g. 1 to 3%.

The solid particles in the slurry are preferably all of a size smaller than 1000 microns and preferably at least 90% are smaller than 500 microns, and at least 50% smaller than 150 microns. Most desirably 100% by weight is less than 500 microns and not more than 25% is less than 45 microns. These percentages are by weight and are determined by sieving.

The slurries which are preferred for use in accordance with the present invention have viscosities substantially the same as that of water, that is as compared with conventional battery pastes. The viscosities of these preferred slurries cannot be measured by a Brookfield viscometer because the solids separate out on standing.

Slurries which are preferred for use in accordance with the present invention are desirably readily pourable and the solids desirably settle out rapidly from the liquid phase, namely in less than 15 minutes on standing.

Thus the compositions are desirably characterized by having a rotating vane viscometer torque value (as defined herein) of less than 0.006, preferably not more than 0.004 lbs. ft. at 20° C The suspension half life (as defined herein) of the slurries is preferably not more than 15 minutes preferably in the range 1 to 10 minutes.

The introduction of the slurry into the tubes is preferably carried out under gravity i.e. at zero pressure or at a pressure of less than 5 psi until the tubes are filled with the composition, the pressure then being allowed to rise to a value not in excess of 100 psi and the pressure thereafter being released.

In one arrangement, the tubes are allowed to fill substantially under gravity and then the pressure is allowed to build up to apply pressure to the active material in the filled tube for only a fraction of the time taken to fill the tube. Thus the pressure may be in the range 5 to 50, e.g., 10 to 30 psi, applied, e.g. for one-tenth to one half the time taken to fill the tube or for a time equal to that taken to fill the tube. Thus the tube may take 5 to 15 seconds to fill and the pressure may be applied for 1 to 5 seconds.

In another arrangement the pressure is applied for longer periods of time. In this arrangement, the tubes are allowed to fill substantially under gravity by the slurry being pumped into the tubes under zero back pressure; once the tubes have filled the pumping is continued and the back pressure allowed to build up to a value not in excess of 70 psi. Thus the pressure may be in the range 5 to 50, e.g. 10 to 30 psi. The weight of oxide in the tubes can be adjusted by adjusting the pressure build up as is indicated in the examples. Usually the pressure is merely allowed to build up to a set value at which point the pressure is released.

The material of the tube as indicated above is selected to have a filtering action on the active material used. However this does not mean that all the active material is removed from the liquids issuing from the tubes merely that a proportion is retained within the tubes.

As mentioned above the ratio of active material to liquids which should be used depends on a variety of factors including the nature of the material from which the tubes are made.

A balance must be struck between the need for the material to have a high water permeability to provide good conductivity in use in the battery and the need for the material to have a good filtering action so as to enable filling to be carried out rapidly and the active material to be retained in the tubes over long periods of use and under conditions of shock and vibration. One suitable material is made from a nonwoven batt of of alkali resistant fibres, e.g. nylon or glass fibres, which is 0.5 to 0.7 mm thick and weighs 120 to 160 grams per sq. cm. This is not perforated its porosity being derived from the various gaps between the fibres from which it is made. It has a nitrogen permeability (as hereinafter defined) of 8.0 liters/sq.cm./minute, and a water permeability (as hereinafter defined) of 1.5 liters/sq.cm./minute.

More broadly, it is preferred to use a material having a nitrogen permeability in the range 0.5 to 20 preferably 1 to 10 or more preferably 3 to 9 liters/sq.cm./min. Desirably, it should also have a water permeability of at least 0.1 liters/sq.cm./min, preferably 0.1 or 0.5 to 1, 2 or 5 liters per minute or more.

The active material may be any desired for the particular battery being made and whilst the invention is described with reference to nickel cadmium alkaline batteries the teaching of the invention concerning the necessary requirements for the active material composition and the material of the envelope, whereby filtration filling is achieved and a bed of active material is built up from the bottom of the envelope (the top in use) can be applied to other electrochemical systems.

Preferably, the tubes are clamped at the top and bottom so that the liquids can escape out from the whole area of the tubes.

Desirably, a supply of the slurry composition is continuously mixed during the filling and a minor proportion of the slurry supply is introduced from this continuously mixed supply into each tubular plate.

The supply of slurry composition is preferably delivered by a pump which gives smooth delivery and maintains the slurry in suspension and the slurry, in the intervals between introduction into a tubular plate, is recirculated from the outlet of the pump back to its inlet, e.g., via a recirculating tube, connected to the pump outlet, and an agitated storage tank, from which a supply tube extends to the pump inlet.

In a first form of the method, the slurry is introduced from a pump into one tubular plate then when that plate is filled is continuously recirculated from the outlet of the pump to the pump inlet and is then introduced into another tubular plate.

The apparatus for carrying out the method in accordance with the invention preferably comprises at least one filling station comprising means for supporting the envelope of a plate assembled on its current conducting element in a substantially vertical plane and a filling manifold adapted to introduce slurry into the envelope of a plate located in the said supporting means, the apparatus further comprising, a slurry storage tank provided with agitating means adapted to contain a supply of active material slurry, and delivery means for delivering the slurry from the storage tank to the manifold of a selected filling station.

The deliver means preferably include recirculating means for recirculating the slurry to the storage tank when the slurry is not being delivered to a filling station.

The delivery means may comprise a pump having an inlet pipe communicating with the storage tank and valve means, the recirculating valve, communicating with the outlet of the pump for directing, preferably selectively, the slurry to the station, or when more than one station is used, to a selected station, or for recirculating the slurry to the storage tank.

The means for supporting the plates are preferably adapted to support tubular plates and comprise a frame rigidly secured to the filling manifold and carrying top and bottom clamps arranged to releaseably clamp the plate to the frame.

The clamps may be toothed and conform to the outside surface profile of the bottom and top of the tubular plate.

At least the top clamp is preferably provided with a resilient sealing liner.

The manifold of preferably adapted for use with tubular plates and then preferably has an outlet nozzle assembly consisting of rigid feed tubes spaced apart in a straight line with their centres on the centres of the tubes of the plate and having external diameters corresponding to the internal diameters of the tubes of the plate. Thus the tubes are preferably arranged vertically so that the slurry is fed in from the top of the tubes.

The feed tubes may extend through a resilient gasket, the dimensions of the frame in relation to the plate being such that the end of the plate has to be forced up into the gasket in order to locate the plate in the supporting means.

Preferably a pressure responsive valve is located in communication with the inlet side of each filling manifold.

Preferably at least two filling stations are provided for each pump and slurry storage tank and the recirculating valve is a three way valve.

The or each pressure responsive valve may be arranged to actuate automatic switching of the recirculating valve or the valve means connecting the or each manifold to the common feed pipe to the recirculating position and to release the pressure on the plate as soon as a preset pressure is reached.

The pump preferably comprises a rotor in the form of a single start helic fitting in a cylinder in the form of a double start helic of twice the pitch of the rotor, in which the rotor turns about its own axis in one direction, whilst its axis orbits about the axis of the cylinder in the opposite direction at the same speed.

In a further broader aspect of the invention the method is not restricted to the filling of tubular sheathed plates. Thus other shapes of sheath can be used, e.g. envelope shaped sheaths and in this case the grid need no longer be in the form of a comb of spines but could be a conventional cast grid or a reticulated plate, e.g. an expanded metal mesh or a sheet with apertures punched through it, it could even be a solid plate so long as the necessary current collecting function was adequately carried out.

The sheath can be of flexible material or of rigid or stiff material but at least when the sheath is flexible it is preferred to support its faces with porous support means, e.g. rigid foraminous sheets, meshes or grids during the filling operation so as to keep the plate substantially parallel sided whilst permitting the liquids to pass through.

With this arrangement the inlet manifold also has to be modified so that, instead of a row of tubes which plug into the ends of the individual tubes of the sheath, a single or double tubular slot is provided to plug into the open bottom end of the sheath. A double slot arrangement which nests over the end of the grid and affords a pair of slots extending along either side of the grid and can be clamped thereto may have advantages over a single slot arrangement.

The end of the sheath can be sealed with an elongated bottom bar after filling. This can consist of an internal plug gripping the end of the grid and an external clip or integral flange on the plug arranged to grip the outside of the envelope and hold it in against the plug.

In another alternative instead of an inlet manifold of fixed tubular outlets or fixed slots an arrangement of retractable filling tubes extending down into the sheath can be used. The arrangement would start with the filling tubes fully extended down into the sheath around the spines (which now need not have centering fins since the filling tubes perform this function). As the active material issues from the ends of the tubes the tubes are withdrawn up along the sheath and finally halt at the open top end of the sheath where they may be momentarily clamped and then released to complete filling of the plate.

Clearly however this arrangement is more complicated than the arrangement in which the slurry is merely fed in at the tops of the tubes and this simple arrangement is much preferred.

The invention may be put into practice in various ways and one specific embodiment and certain modifications will be described by way of example with reference to the accompanying drawings, in which.

Figure 9:
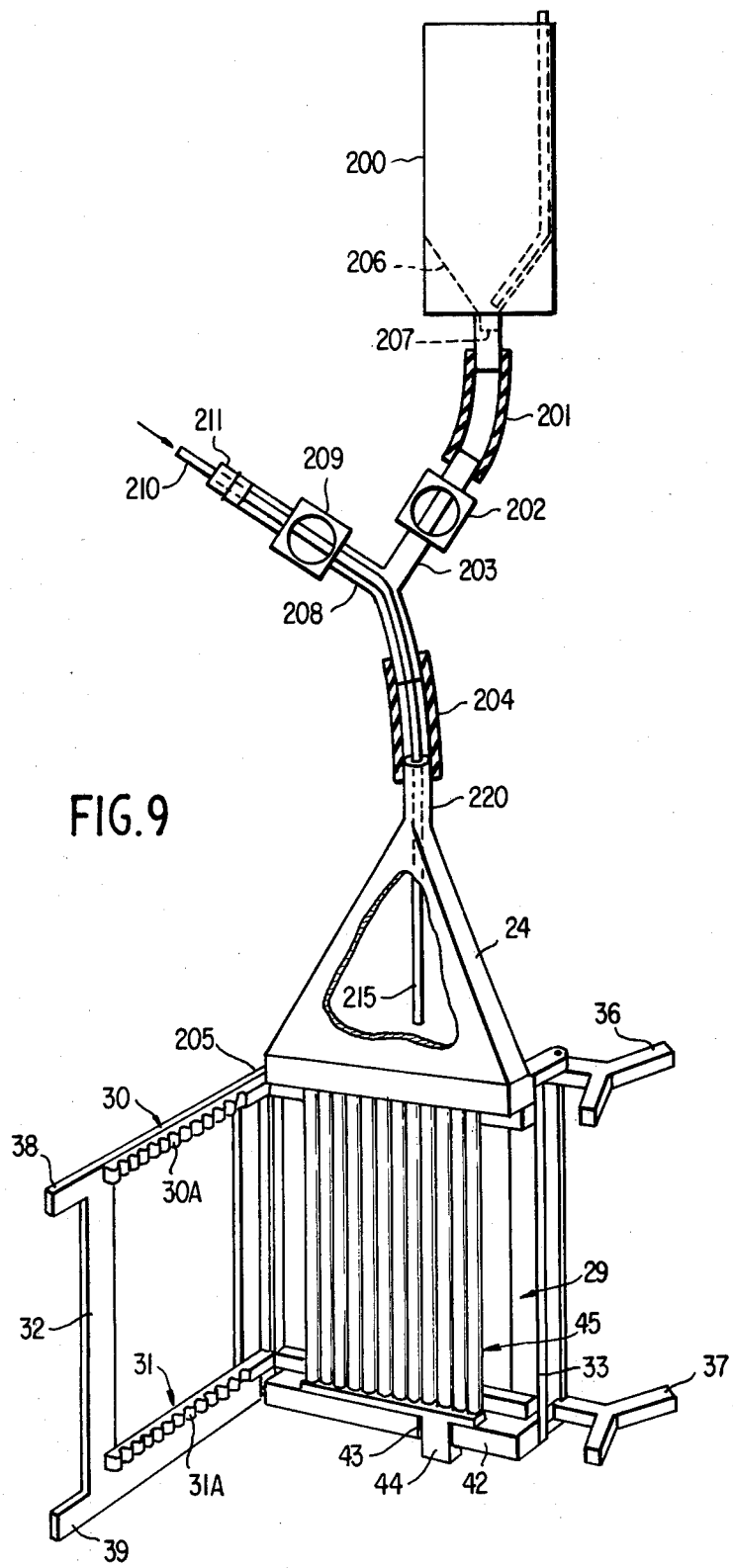
FIG. 9 is a view similar to FIG. 2 showing a modified arrangement of the filling apparatus shown in FIG. 2 having a valve gravity feed and air injection stirring in the manifold.
Figure 10:
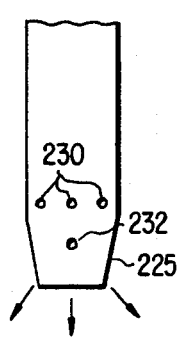
Figure 11:
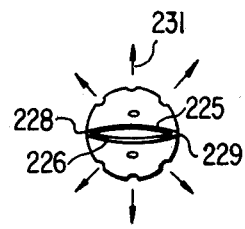
Figure 12:
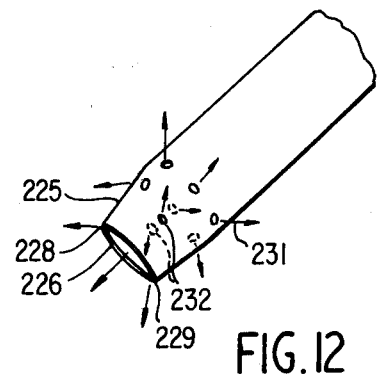
Figure 13:
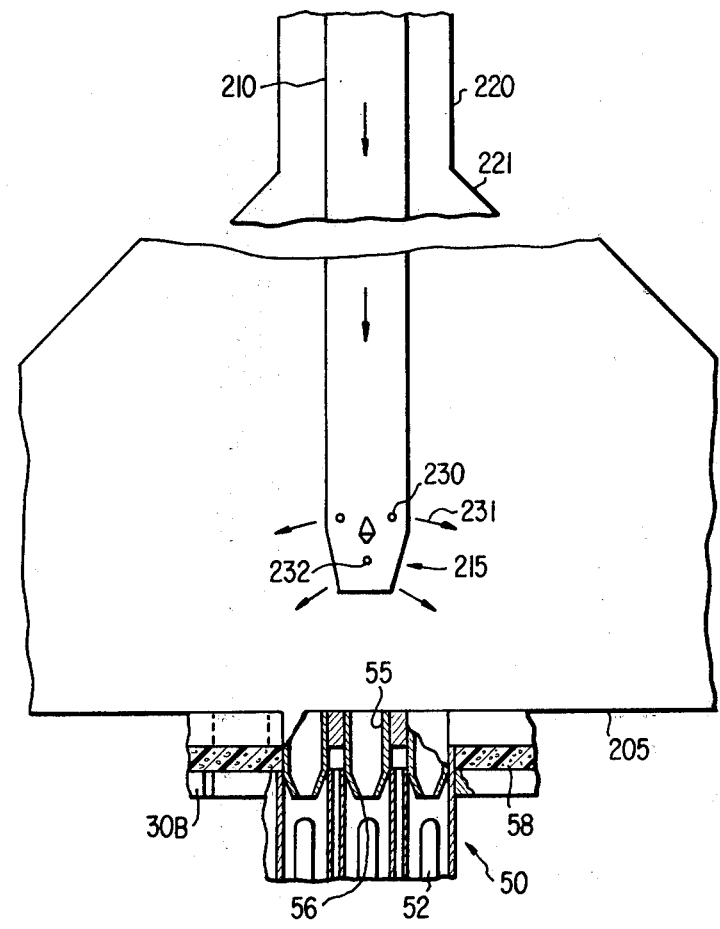

FIGS. 10 to 12 are diagrammatic views on an enlarged scale of a preferred diffuser arrangement for the outlet end of the air injector hose shown in FIG. 9, FIG. 10 is a side elevation, FIG. 11 is an end elevation, FIG. 12 is a perspective view of the diffuser from the outlet end, and FIG. 13 is a diagrammatic fragmental view of the manifold and air hose 110 showing their relative positions in detail.

Figure 14:
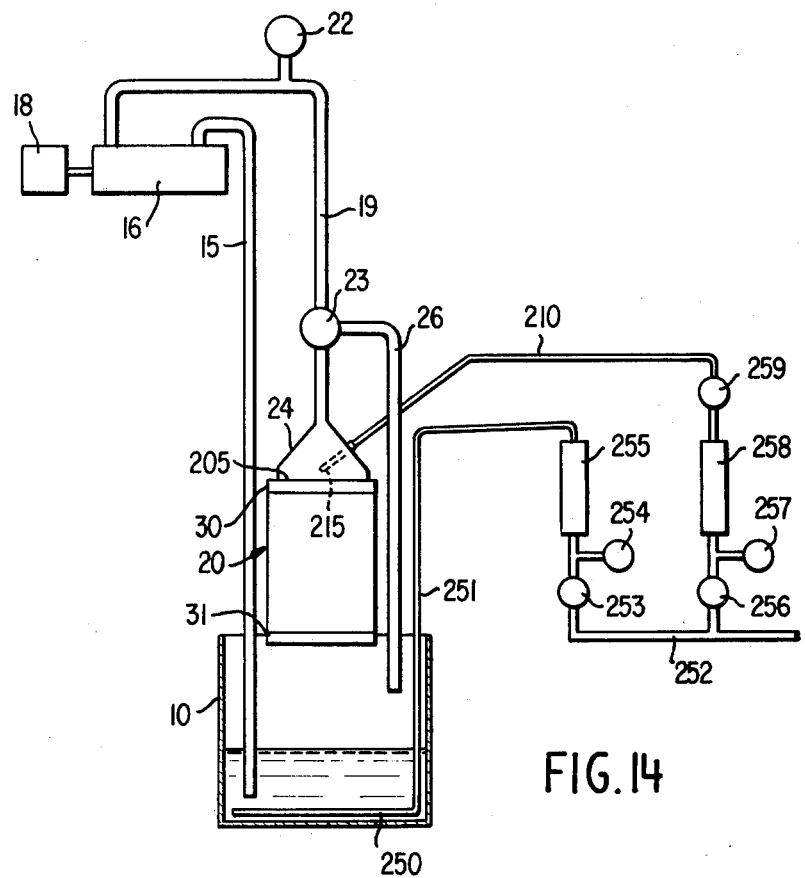
Figure 15:
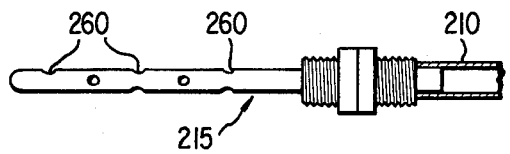

FIGS. 14 and 15 are diagrammatic views of other embodiments of apparatus for use in the invention.

FIGS. 1 to 5 illustrate a preferred filling apparatus for carrying out the invention which enables the plates to be filled essentially under gravity and then permits one to allow the back pressure in the supply of slurry to the manifold to buildup so as to enable one to vary the filling weight as desired.

Figure 6:
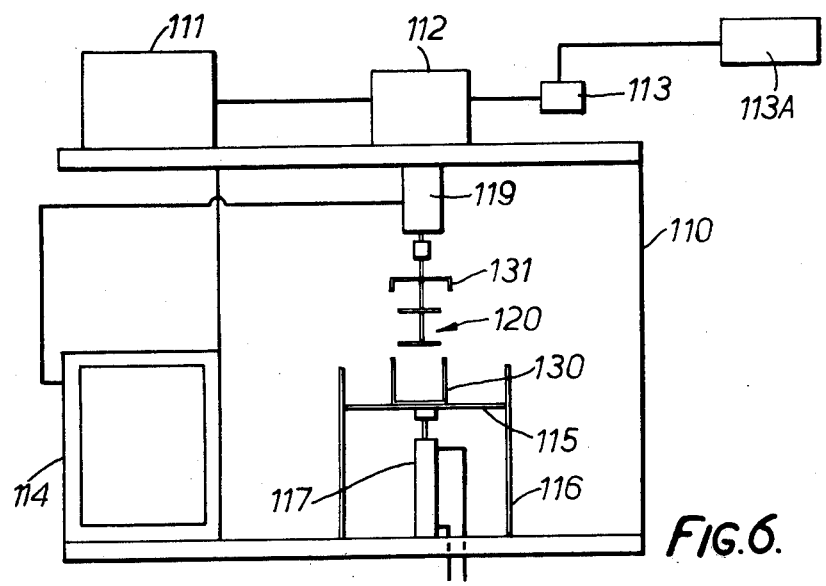
FIG. 6 is a general front elevational view of the rotating vane viscometer used to measure the viscosities of the slurries used in the invention.
Figure 7:
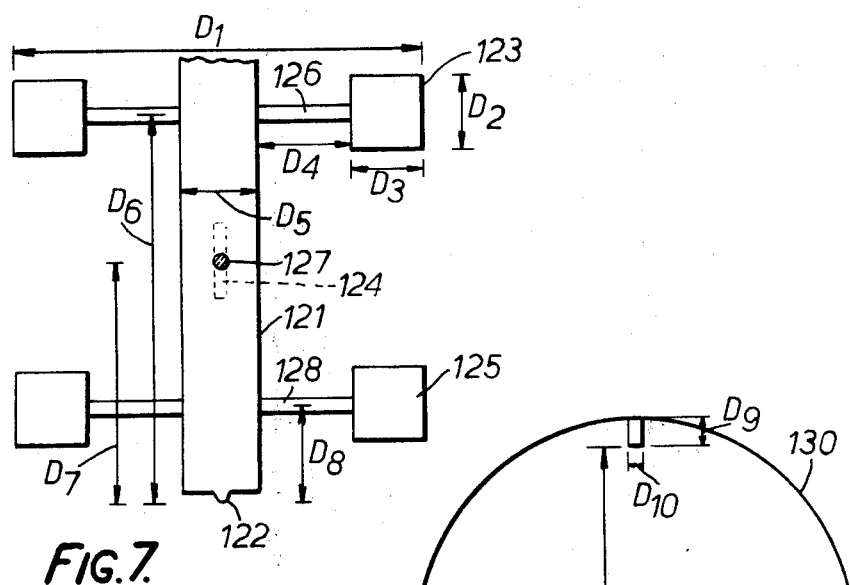
FIG. 7 is a detailed front elevational view of the paddle assembly of the viscometer of FIG. 6.
Figure 8:
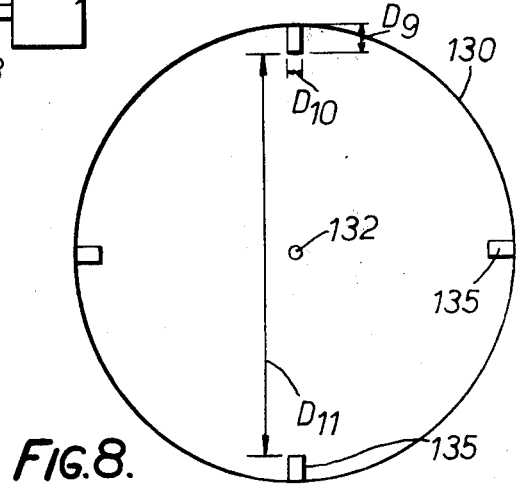
FIG. 8 is a plane view of the container for use with the viscometer of FIG. 6 for containing the sample whose viscosity is to be measured.

FIGS. 6 to 8 illustrate the rotating vane viscometer used to define the viscosity properties of the slurries used in the invention.

FIGS. 9 to 12 show the modified apparatus used for the Examples described herein.

The apparatus of FIGS. 1 to 5 will be described first since the manifold shown in these figures is used in the apparatus of FIGS. 9 to 12.

The apparatus consists of a slurry tank 10 in which the slurry to be filled into the plate tubes is stored.

The tank is fitted with a paddle 11 located at the bottom of the tank and driven by a belt and pulley drive 12 from a variable speed motor 13 e.g. at 30 to 70 rpm to maintain the solids in suspension. A vertical feed tube 15 extends up from just above the paddle 11 to the inlet to a supply pump 16 which is also driven by a belt and pulley drive 17 from a variable speed motor 18. The outlet of the pump 16 is connected vertically downwards by a supply pipe 19 to a plate filling station 20. The supply pipe proceeds via a pressure gauge 22 a two-way valve 23 and a fishtail manifold 24. The valve 23 either permits the slurry to flow vertically downwards to the station 20 or cam be positioned to direct the slurry to the tank 10 via a recirculating tube 26 which extends down to just above the paddle 11. The tubes 15 and 26 are preferably of the same cross-sectional area.

The mass of the supply of slurry is preferably maintained at about 150 kg, e.g. 100 to 200 kg, and the mass of slurry introduced into each tubular plate, the individual filling weight, is of the order of 400 to 1,000 gm. More broadly, the weight ratio of the active material, e.g. 75 kg, in the continuously mixed slurry supply to the individual filling weight is in the range 1300:1 to 25:1 preferably 1000:1 to 200:1 more particularly 160:1 to 100:1.

The station 20 comprises a frame 28 rigidly secured in relation to the manifold 24 and carrying top and bottom clamps 30 and 31.

The clamps 30 and 31 are toothed and conform to the outside surface profile of the bottom and top of the tubular plate since the plate is inserted in the clamps with its open bottom end facing the manifold 24. The manifold has an outlet nozzle assembly consisting of ¼ inch long copper or other rigid feed tubes with external diameters corresponding to the internal diameters of the plate tubes and spaced apart in a straight line, the centres of the feed tubes being on the centres of the plate tubes.

Thus the open ends of the plate tubes fit snugly over the feed tubes and are clamped thereto by the top clamp 30 which may be provided with a resilient sealing liner.

The lower clamp 31 holds the plate in position and presses the tubes against a thickened end section on the spines. The faces of the plate are completely free.

The spines are of appropriate metal composition and of conventional structure being located on a top bar at centres corresponding to the centres of the tubes with which they will be used. They are desirably provided with short axial fins which are used to centre the spines in the tubes and to prevent the spines being distorted during handling prior to filling.

The station 20 will now be described in more detail with reference to FIGS. 2 to 5.

As mentioned above, the station 20 comprises a frame 29 rigidly secured in relation to the manifold 24. This frame is in two parts 32 and 33 hinged to each other along the left hand edge, and it is the part 33 which is rigidly attached to the manifold 24. The top and bottom clamps are each in two parts 30A and 30B and 31A and 31B. 30A and 31A are carried by the movable part 32 of the frame 29 and 30B and 31B are cArried by the fixed part 33 of the frame 29.

The fixeed part 33 also carries top and bottom locking levers 36 and 37 which are arranged to engage top and bottom handles 38 and 39 on the movable frame part 32, and lock the filling station closed.

The fixed part 33 of the frame 29 also carries a bottom support bar 42 which has an aperture 43 through which the lug 44 of a plate 45 can pass and which assists in registering the plate in the filling station.

The top and bottom clamps 30 and 31 have toothed profiles which conform to the external sheathed dimensions of the plate and the two portions of each clamp when closed define a row of cylindrical holes 48 connected by gaps 49 twice the thickness of the fabric 47 of the sheath so as to prevent the sheath being cut by the clamps.

The bottom clamp 31 presses the fabric 47 of the sheath against the broadened shoulders 51 of the spines 52 of the plate to ensure a tight seal. (See FIGS. 3 and 4).

Figure 5:
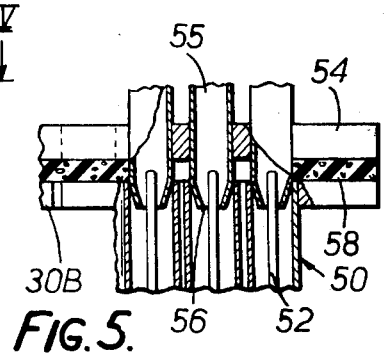
FIG. 5 is a part cross-sectional view of part of the upper clamp in the open position, as in FIG. 3.

FIG. 5 shows the clamping arrangement at the manifold 24. A manifold plate 54 has a row of feed tubes 55 passing down through it and having narrowed ends 56 which extend through apertures in a rubber gasket 58. It is resilient being compressible by finger pressure to only about half its uncompressed thickness, which is about ⅛ inch thick. The arrangement shown in FIG. 5 shows the sheath 50 in position over the ends 56 of the feed tubes. However, the arrangement is in fact such that the gasket 58 has to be compressed by about 1/16 inch by the sheath 50 being forced up into it in order to get the top bar of the plate onto the bottom bar 42 of the frame. (This compression has not been shown in the drawing). The clamp 30 presses the fabric 47 of the sheath around the ends 56 of the feed tubes 55 to achieve a good top seal.

The pump 16 is one which gives smooth delivery and is of the well known type, such as that marketed under the trade name MONOPUMP, which comprises a rotor in the form of a single start helix fitting in a cylinder in the form of a double start helix of twice the pitch of the rotor, in which the rotor turns about its own axis in one direction whilst its axis orbits about the axis of the cylinder in the opposite direction at the same speed. This form of pump gives a positive displacement with uniform flow, and prevents the separation of liquids and solids in the composition.

In another arrangement (not shown) the filling station 20 is formed as a twin manifold arrangement each manifold being fed from the pump 16. The two way valve 23 is replaced by a three way valve and each line from the valve 23 to a manifold contains a pressure responsive valve 70.

This valve 70 is preferably a pressure release valve which can be set to any desired pressure e.g. 15 psi and when this pressure is reached will hold the pressure at 15 psi until actuated, e.g. manually.

The procedure would then be for a plate to be inserted in one manifold and the valve 23 switched either from recirculation or from the other manifold. The plate would fill e.g. in 5 seconds and then the pressure would rise to 15 psi and be held there for 5 seconds. During this time the operator would have removed the filled plate from the other manifold and inserted a new plate. He could then switch the valve 23 either to recirculate momentarily or immediately to fill the new plate.

In an alternative arrangement the pressure release valves 70 is arranged to switch the pump supply to recirculation and release the pressure on the plate as soon as the preset pressure is reached.

In operation, the filling process is as follows.

The composition is made up to the desired composition in the tank 10 by use of the paddle 11. A tubular plate 50 is assembled, the fabric tubes 47 being located on the metal spines 52, and it is positioned against the clamps 30B and 31B, at the station 20 with its open bottom ends pushed up against the gasket 58 and over ends 56 of the feed tubes 55 of the manifold 24. The part 32 of the frame is then swung closed against the part 33 and the clamps 30 and 31 thus closed and the locking arms 36 and 37 secured over the handles 38 and 39. The paddle 11 is kept in operation and the valve 23 is turned to the recirculating position connecting the pump 16 to the tube 28 and the pump 16 is switched on. Recirculation is carried out until the flow is steady. The pressure indicator 22 indicates zero pressure whilst recirculation is occuring.

The valve 23 is then switched to connect the pump 16 to the manifold 24. The slurry passes down into the station 20, the active material filling the interior of the tubes. The valve 23 is maintained in this position until the tubes have filled with active material at which point the pressure indicator indicates a relatively sudden increase in pressure. When the pressure reaches the desired shut off value the valve 23 is then switched to recirculate the composition to the tank 10 via the pipe 26.

The clamps 30 and 31 are then opened and the filled plate removed and the further processing operations such as bottom bar insertion, soaking, drying and electrolytic formation carried out on the plate.

The excess slurry in the manifold 24 falls down into the tank 10.

In continuous operation, the pressure rise indicated by the indicator 22 could be used to control the filling cycle, e.g. to activate the valve 23, and open the clamps 30 and 31 to disengage it from the manifold 24 and re-engage a new plate in the clamped position. Limit switches could be provided, which would be activated by the new plate engaging the manifold 24 to divert the valve 23 back to the filling position.

The apparatus shown in FIGS. 9 and 13 will now be described.

Figure 1:
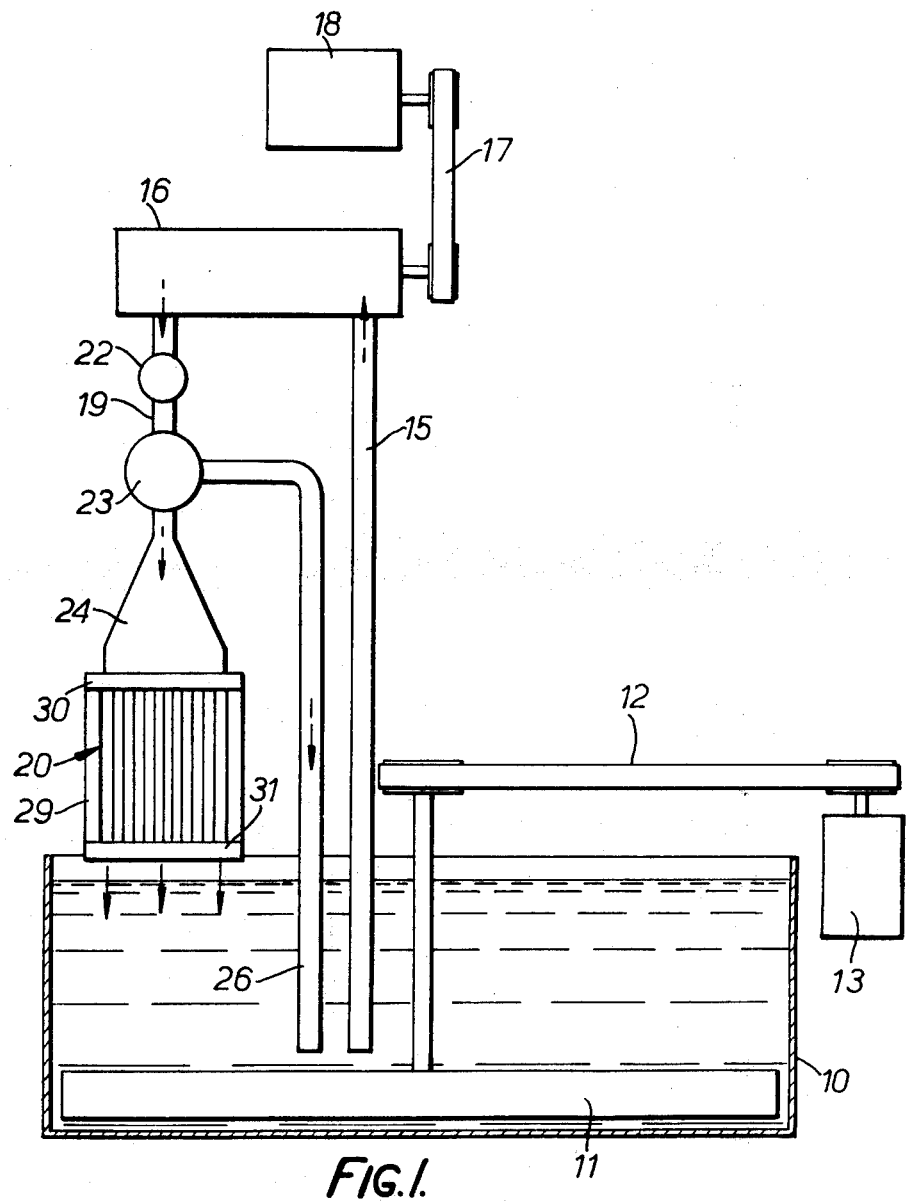
FIG. 1 is a diagrammatic side elevation of one embodiment of apparatus in accordance with the invention.
Figure 2:
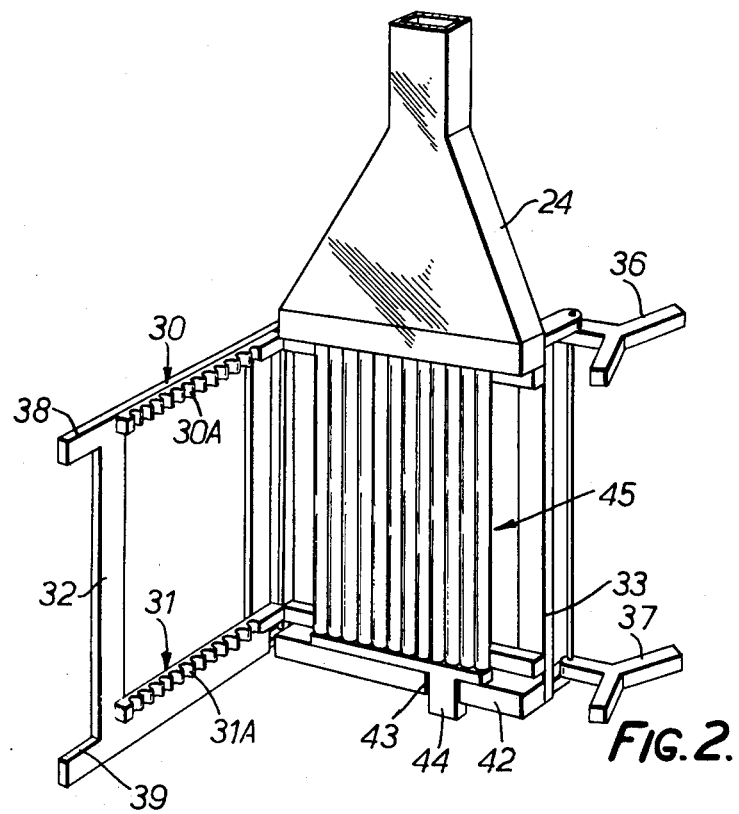
FIG. 2 is an enlarged diagrammatic perspective view of the filling box shown in FIG. 1.
Figure 4:
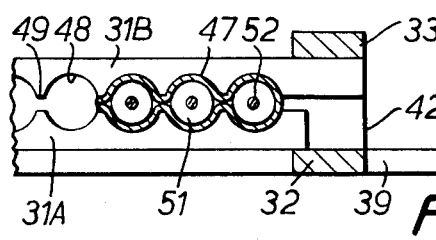
FIG. 4 is a cross-sectional plan view on the line IV—IV of FIG. 3.
Figure 3:
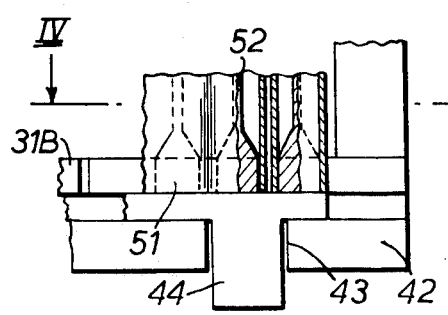
FIG. 3 is a diagrammatic view of part of the lower clamp shown in FIG. 2 in the open position, showing only some of the tubes of the plate.

As can be seen from FIG. 9 the apparatus is a simplified version of that shown in FIG. 1 and does not have provision for continuous stirring of the slurry and recirculation of slurry which has passed through the walls of the tubular sheath and has no provision for the application of a measured pressure to the slurry supply after the tubes have been filled under gravity with the slurry.

The slurry supply in this arrangement is from a calibrated tank 200 located above the manifold 24 and connected thereto by a supply pipe 201, a valve 202, a Y shaped connector 203 and further supply pipe 204; the pipe 201, valve 202 and pipe 204 being arranged as nearly as possible vertically.

The slurry is thus fed into the manifold under gravity under a hydrostatic head of about 18 inches to 36 inches. In order to standardize the hydrostatic head the slurry was always put into the tank 200 to the same level about 30 inches above the inlet level 205 to the plates.

The cylinder 200 contained a tight fitting plastic funnel 206 with its end 207 projecting into the pipe 201. This prevented solids settling out in the tank 200 and enabled them to be readily stirred by an air hose 208 having its end located just above the outlet to the tank 207.

The other leg 208 of the Y piece 203 is also connected to a valve 209 through which water can be introduced to flush out the manifold in use. An air injection hose 210 passes through a stopper 211 which removably seals the inlet to the leg 208. The hose 210 can be slid backwards and forwards in the stopper 211 through 1 to 4 inches without breaking the seal to the leg 208. The hose 210 also passes through the valve 209 down the tube 204 and into the manifold 24.

The end 215 of the hose 210 is arranged in use to be about 0.5 to 1.0 inches above the inlet level 205 to the plate.

This air hose arrangement was not used for examples 1 to 7 below and more even filling was found to result in Examples 8 to 14 where it was used and very even filling when the modified outlet piece 216 shown in FIGS. 10 to 12 was used (Examples 15 to 23).

FIG. 13 shows the in fragmented form the dispostion of the air injection hose 210 in the manifold 24. The internal diameter of the inlet pipe 220 to the manifold 24 was about 20 to 25 mms.

We found that with the slurries used in examples 1 to 23 below an air flow of about 3 to 12 preferably 5 to 10 especially about 7 liters per minute with the modified outlet piece 216 produced excellent distribution of the slurry into the tubes when the hose 215 was located vertically above the central tubes and 0.5 to 1 inches therefrom; particularly good results were obtained if the hose was oscillated between these positions about once every 1 to 5 seconds. The fishtail housing of the manifold is about 25 mms. in thickness and about 100 mms. high from the point 221 to the inlet level 205. The transverse dimension of the inlet level 205 is about 6 inches (150mms.) The internal volume of the manifold 24 is thus about 16 cubic inches or about 260 cc.

The modified outlet piece 216 shown in FIGS. 10 to 13 was made by melting and squashing the end 215 of the hose 210 in a vice for a length of about 7 mms. and then cutting off the end of the flattened piece and cutting the outwardly extending ears off so as to leave a pair of flaps 225, 226 having an end slot 227 and angled side slots 228 and 229 so that a fan shaped sheet of air issues from these apertures.

In addition in order to achieve sideways stirring holes 230, about 0.5 mm in diameter, were made in the cylindrical unflattened portion of the tube 215 about 7 mms from the end of the flattened portion. Jets of air 231 issue radially from these holes. In addition a pair of holes 232 again about 0.5 mm in diameter were made in the inclined region of the tube between the flattened region and the unflattened region. Jets of air 233 issue from these holes downwardly towards the flattened end at about 30° to 60° to the longitudinal axis of the tube 210. The apparatuus shown in FIGS. 14 and 15 will now be described.

As can be seen from FIG. 14 the apparatus is similar to that shown in FIG. 1 but incorporates provision for air injection into the manifold 24 in a similar manner to the apparatus shown in FIG. 9 using a hose 210 to feed an outlet end 215 located within the manifold 24, and idential parts are identified by the same reference numerals.

The slurry is recirculated by a pump 16 and supplied to the filling station 20 in exactly the same manner as described for FIG. 1, the only difference being in the stirring of the slurry in the tank 10 which is achieved by a perforated air hose 250 extending around the bottom inside face of the tank and supplied with air by an air line 251. A propeller stirrer (not shown) was also used in addition to the air stirring.

The same manifold 24 and filling station as described for FIG. 9 is used for FIG. 15.

The air injection and stirring is provided from an air line 252, the stirring via a valve 253, a pressure gauge 254 and a flowmeter 255; and the air injection via a valve 256, a pressure gauge 257, a flowmeter 258 and a shut off valve 259.

The end 215 of the hose 210 was shaped from a copper tube of about 3/16 inches external diameter about two inches long and is shown on a slightly enlarged scale in FIG. 15 and in the orientation in which it is located in the manifold. Thus it is positioned at about 45° to the vertical and has the three holes 260 facing upwardly in a vertical plane.

EXAMPLES 1 to 23

Examples will now be given of specific plate production techniques, using the apparatus of FIGS. 9 to 13.

The plates were positive plates having 15 tubes each 14.5 inches long. The tubes were made of non woven polyethylene terephthalate fibre for these experiments but in production an alkali resistant fibre, such as nylon or glass fibre, would be used. These alkali resistant fabrics would desirably have the same characteristics as the polyester fabric used in these experiments. This was made as follows.

A thin web (1.5 meters wide) of fibres having an average length of 4½ inches is produced by carding, and a fleece is produced by layering approximately ten webs to form a continuous length of non-woven fabric (also 1.5 meters wide).

The fibres extend generally longitudinally in the web, whiich is pleated in a zig-zag fashion as it is taken off from a conveyor travelling in the direction of the length of the web onto a conveyor travelling at right angles thereto. Thus the fibres extend substantially transversely to the length of the fleece, but due to the travel of the second conveyor the fibres in adjacent layers are oppositely inclined at a small angle to the transverse direction.

This material is then impregnated with 50% by weight of polyacrylic binder. It has a thickness of 0.5 to 0.7 mm and weighs 120 to 160 grams/sq cm.

This material is then converted into an array of tubes by passing two layers of it through a multiple sewing machine to secure the layers together along parallel lines (for example, spaced about two to the inch) to form pockets or tubes in the conventional manner.

This material is then dipped in a phenolic resin and dried. The material picks up 30% of phenolic resin based on the dry weight of the non-woven material. After cutting to length circular section mandrels 0.287 inches in diameter are then inserted between the rows of stitches to form the pockets. It has an air permeability of 8.0 liters/minute/sq cm and a water permeability of 1.5 liters/minute/sq cm area.

This non-woven fabric is made up of randomly entangled individual fibres. The fibres have a diameter of about 25 microns or more broadly 20 to 50 mircons. The gaps between individual fibres are in general less than 250 microns and mostly less than 100 microns and moreover the material in having a thickness of 0.5 to 0.7 mms has a three dimensional structure permitting the overlap of many individual fibres in any one path from face to face of the sheet.

Air permeability was measured as follows:

A sample 2.8 cm in diameter (6.16 sq cm effective cross-sectional area) was clamped in position and the time for 50 l of dry nitrogen to flow through the sample at 20° C under pressure difference of 0.6 inches (1.5 cms) water gauge was recorded.

The material is too permeable for mercury porosimetry or air flow through an alcohol saturated sample to be accurate measurement techniques.

Water permeability was measured on the same sample by measuring the time taken for a column of water initially 42 cm high and 1 litre in volume to flow under gravity through liter sample.

The downstream end of the column below the sample was blocked off, the water introduced above the sample and then the downstream end below the sample opened to atmosphere. This material is referred to as the non woven fabric N.W. in Tables 2A to 2E below.

The internal volume of the sheathed plates, sheathed with NW tubes, free to be filled with active material is 180 cc.

An alternative fabric which could be used, subject to being made of alkali resistant materials is a spun woven fabric which has an air permeability of 6.0 liters/sq cm/minute. It has 17 weft threads per cm and 22 warp threads per cm. The warp threads being about 250 microns in diameter and the weft threads being about 375 microns in diameter. Microscopic examination indicates that the gaps between adjacent warp threads and adjacent weft threads are about 250 microns by 250 microns maximum but these gaps are bridged by numerous loose fibres extending out from the threads.

EXAMPLES 1 to 7

The following procedure used was used for Examples 1 to 7.

In these examples the air hose 110 as not used.

In examples 2 and 3 the hose 108 was removed and the funnel 106 was not used and a close fitting rubber plunger was inserted in the top of the tank and was used to force additional slurry into the plates after the plates had been filled under gravity.

The Y piece 103 was replaced by a direct connection of the pipe 104 to the valve 102.

The slurry composition was made up and thoroughly shaken in a closed container a sample first being kept for sedimentation and viscosity measurements. A sheathed spined plate was made up from the tubular envelope described above and conventional lead grids, used in these experiments for ease of availability, and was then clamped into position. The valve 102 was closed. The slurry was then poured into the tank 100 to the standard level and the valve 102 opened immediately. The turbulence of the pouring of the well shaken slurry into the tank kept the solids largely in suspension. The slurry flowed down into the tubes and passed to the bottom of the tubes adjacent the bar 43 where liquids immediately issued from the tubes as large droplets which coalesced as the solids level built up inside the tube back to the inlet. This filling pattern is identified as B in tables 2A to 2E and is known, by us a filtration filling. In certain other examples 4, 5 and 6 the slurry starts to lose water as soon as it enters the top of the tubes and then progresses down the tubes to the bottom. This is identified as A in the tables and is referred to as injection filling. This type of filling tends to occur with slurries having higher solids to liquids ratios and we have found in other work with particulate slurries that slurries having rotating vane viscometer torque values (as defined herein) of less than 0.006 lbs, ft at 20° C tend to fill by the type B pattern or filtration fill, whilst above this torque value the tendency is to type A filling, injection filling. We have also found that with type A filling there is a tendency for the particles to pack in the region of the inlet end to the tubes.

The plate was then removed and weighed to obtain the weight of active material present in the tubes, the dry weight of the lead grids and the fabric tube already being known. The plate was then marked and a polyethylene bottom bar inserted. The plate was then dried at 70° C for 24 hours. Selected plates were then cut up and the cut portions weighed (see Tables 3 and notes thereon).

In some cases not all the tubes filled. This was found to be due to blocking of the nozzles 55 in the manifold by large particles of active material.

It was thus found best to drain the tank 100, pipe 101 and valve 102 after each experiment and flush the system out with water both down through the tank and up through the nozzles 55.

In those cases, Examples 2,3,4,5,6,7,8,9,10,12,14,16,19 and 23 where the tubes were not all filled by the first gravity feed, the apparatus was flushed out as described and a further standard volume supplied to the plates this usually filled some of the remaining empty tubes. These examples are referred to as A for the first filling run, B for the second filling run on the same plate and C for the third filling run on the same plate, etc.

The results for these examples are given in Tables 1A and 1B and the viscosities of the slurries used are given in Table 3 and stratificaton results are given in Table 4.

The active materials used are identified as negative, positive 1 and positive 2.

Negative is a conventional negative alkaline active material containing by weight 76% cadmium hydroxide Cd(OH)$_2$, 5% cadmium, 15% iron oxide Fe$_2$Oh$_3$, 2% graphite and 2% paraffin.

This was subjected to sieve analysis which indicated the following particle size

| analysis | % by weight |
|---|---|
| Greater than 16 mesh (1000 microns) | 0 |
| Less than 16 mesh | 100 |
| less than 22 mesh (699 microns) | 98 |
| less than 30 mesh (500 microns) | 94 |
| less than 60 mesh (250 microns) | 82 |
| less than 100 mesh (150 microns) | 64 |
| less than 350 mesh (45 microns) | 42 |

Positive 1 is a conventional positive alkaline active material containing by weight 85% nickel hydroxide Ni(OH)$_2$ and 15% of powdered and flake graphite. (66:34 ratio of powdered to flake graphite.

We found that the large particles of the flake graphite were tending to introduce more frequent blocking of the plate and by subjecting a sample to sieving to remove at least a major proportion of the material of particle size less than 40 mesh this problem could be overcome.

Positive 2 is this partially sieved sample. This was subjected to seive analysis which indicated the following particle size analysis:

|  | % by weight |
|---|---|
| Greater than 16 mesh (1000 microns) | 0 |
| less than 16 mesh (1000 microns) | 100 |
| less than 22 mesh (699 microns) | 100 |
| less than 30 mesh (500 microns) | 100 |
| less than 60 mesh (250 microns) | 97 |
| less than 100 mesh (150 microns) | 86 |
| less than 150 (105 microns) | 77 |
| less than 350 (45 microns) | 50 |

Visual examination of the sieve fractions indicated that the coarsest fraction was made up of graphite flakes 1 to 2 mms across. Visual examination of the positive 2 material indicated that it still contained a substantial proportion of graphite flakes visible in ordinary daylight to the unaided eye with 20/20 vision.

EXAMPLES 8 to 23

The following filling procedure was used for these examples.

In these examples the apparatus described for FIG. 14 was used for Examples 15 to 23.

The slurry composition was well shaken in a closed container and a sample taken for sedimentation and viscosity measurements. The valve 102 was closed and the air line 108 with an outlet as described for outlet 116 switched on at a flow rate of 7 liters/minute. The pipe 104 and manifold were flushed out with water. A plate was clamped in position and the air hose introduced through the valve 109 so that its end 115 was positioned as in FIG. 14 and the stopper 111 inserted. The air line 110 with a plain outlet in Examples 8 to 14 and with the outlet 116 in Examples 15 to 23 was then switched on at a flow rate of 7 liters/minute.

The shaken slurry composition was then rapidly poured into the tank 100 and the valve 102 opened and the air line 110 oscillated up and down about once every 2 to 3 seconds through a vertical distance of about 0.5 to 1 inch.

The slurry filled the tubes in the B type pattern, filtration filling. In certain examplesl 8,9,10,11,13,14,16,19 and 32 some tubes were not filled on the first run and then as for Examples 2,3,4,5,6,7, the plate was removed from the manifold the manifold was flushed out and the run repeated on the partially filled plate.

In some other Examples 16,20,21,22 and 23 the air pressure from the line 110 was used to consolidate the active material in the tubes.

This was done as follows. When the slurry had ceased flowing out of the fabric of the tubes, if necessary additional slurry was poured into the tank 100, the valve 102 was closed and the stopper 111 held in. This caused droplets of water and slurry to flow out of the top half of the plate, the air pressure was allowed to build up until venting occured at the seal to the top clamp 30, the top end of the tube 100 was then occluded but not sealed and the valve 102 opened to vent the pressure to atmosphere and simultaneously stir the slurry in the tank 100. The valve 102 was then opened for a few seconds to introduce more slurry into the manifold 24 and then closed again and the pressure again allowed to build up until venting occurred around the top clamp seal. This sequence was repeated a number of times until no further liquids could be driven out of the plate and only air was being driven through the porous active material and the fabric as evidenced by the presence of water bubbles on the surface of the plate.

A variety of slurry compositions were made up and details of their composition, viscosity, sedimentation and suspension half life are given in Table 1.

TABLE 1

| Slurry reference number | used in Examples | Active material | Solids liquids | Shear rate rpm | Torque lbs ft | presence of peak | % Settlement of sample | suspension half life |
|---|---|---|---|---|---|---|---|---|
| | | | | (see below under 8) Observed Rotating vane viscometer | | | | |
| 810002 | 1, 2, 3 | negative | 0.34/1 | 6 | 0.003 | none | 71 | 5 seconds |
| | | | | 24 | 0.004 | | | |
| | | | | 42 | 0.004 | | | |
| 810004 | 4, 5, 16 | " | 0.56/1 | 6 | 0.003 | none | 90 | — |
| | | | | 24 | 0.004 | | | |
| | | | | 42 | 0.004 | | | |
| 81005 | 17, 18, 19 | " | 0.46/1 | 6 | 0.003 | none | 94 | — |
| | | | | 24 | 0.003 | | | |
| | | | | 42 | 0.004 | | | |
| 810006 | 20, 21 | " | 0.25/1 | 6 | 0.003 | none | 58 | 5 seconds |
| | | | | 24 | 0.003 | | | |
| | | | | 42 | 0.003 | | | |
| 810007 | 22, 23 | " | 0.75/1 | 6 | 0.005 | none | 98 | — |
| | | | | 24 | 0.005 | | | |
| | | | | 42 | 0.005 | | | |
| 810010 | 6 | Positive 1 | 1/1 | 6 | 0.003 | yes | 50 | 2 min 50 secs |
| | | | | 24 | 0.004 | | | |
| | | | | 42 | 0.004 | | | |
| 810013 | 7, 8, 9 | " | 0.75/1 | 6 | 0.006 | yes | 57 | 3 min 30 secs |
| | | | | 24 | 0.006 | | | |
| | | | | 42 | 0.006 | | | |
| 810015 | 10, 11, 12 | " | 0.5/1 | 6 | 0.003 | none | — | — |
| | | | | 24 | 0.002 | | | |
| | | | | 42 | 0.002 | | | |
| 810017 | 13, 14, 15 | Positive 2 | 0.5/1 | 6 | 0.002 | none | 45 | 2 min 30 secs |
| | | | | 24 | 0.002 | | | |
| | | | | 42 | 0.003 | | | |
| 810001 | — | Negative | 0.96/1 | — | — | — | none measureable | not measureable |

The background torque value for the results in Table was 0.002 lbs. ft.

Table 2

| Ex. | Solids liquids | Slurry reference | Type of Tube | Time taken to fill the plate under gravity seconds | Volume of slurry passed through plate ccs | air injection X plain end Y diffuser end O (3) | pressure application P by plunger A by air (1) | No. of runs to "fill" plate | Tubes empty (2) | Filling appearance | Wet paste in plate grams |
|---|---|---|---|---|---|---|---|---|---|---|---|
| | N = negative P1 = positive 1 P2 = positive 2 | | | | | | | | | | |
| 810101 1 | 0.34/1N | 810002 | NW | 5 | 1000 filtrate 420 cc which settled to 30 cc of solids in 1 min. | none | none | 1 | — | B | 286 |
| 810102 2A | " | " | " | 5 | 500 | " | " | — | Tubes 8 – 15 empty | B | — |
| 2B | " | " | " | " | — | " | P1 | 2 | | | 170 |
| 810103 3A | " | " | " | 8 | 600 | " | none | | Six tubes empty | B | 190 |
| 3B | " | " | " | — | 200 | " | " | | all tubes filled | B | — |
| 3C | " | " | " | — | 200 | " | P1 | 3 | some extra slurry forced in | B | 318 |
| 4A | 0.56/1N | 810004 | " | 18 | 250 | " | none | | six tubes empty | A | — |
| 4B | 0.56/1N | 810004 | NW | 18 | 150 | none | none | 2 | — | A | 306 |
| 5A | " | " | " | — | 600 | " | none | | filled rapidly except for 1 tube | A | |
| 5B | " | " | " | — | 225 | " | " | 2 | all tubes filled | — | 362 |
| 810201 6A | 1/1 P1 | 810010 | NW | 5 | 250 | — | — | | Ten tubes empty | A | 148 |
| 6B | " | " | " | — | 225 | — | — | | little change | — | — |
| 6C | " | " | " | — | 100 | — | — | 3 | — | — | — |
| 810202 7A | 0.75/1 P1 | 810013 | " | 5 | 400 | — | — | | — | B | 168 |
| 7B | " | " | " | — | 300 | — | — | | — | — | 266 |

Table 2-continued

| Ex. | | Solids liquids | N = negative P1 = positive 1 P2 = positive 2 Slurry reference | Type of Tube | Time taken to fill the plate under gravity seconds | Volume of slurry passed through plate ccs | air injection X plain end Y diffuser end O (3) | pressure application P by plunger A by air (1) | No. of runs to "fill" plate | Tubes empty (2) | Filling appearance | Wet paste in plate grams |
|---|---|---|---|---|---|---|---|---|---|---|---|---|
| | 7C | " | " | " | — | 250 | — | — | | — | — | 272 |
| | 7D | " | " | " | — | 100 | — | — | 4 | — | — | 277 |
| 810203 | 8A | " | " | " | 5 | 1200 | X | — | | — | B | 203 |
| | 8B | " | " | " | — | 1200 | X | — | 2 | — | — | 288 |
| 810204 | 9A | 0.75/1 P1 | 810013 | " | 3–5 | 1200 | X O | — | | all tubes filled | B | 366 |
| | 9B | " | " | " | — | 450 | X O | A | 2 | — | — | — |
| 810205 | 10A | 0.5/1 P1 | 810015 | " | 5 | 500 | none | — | | Nine tubes filled | B | 226 |
| | 10B | " | | | — | 200 | " | A | | 3 more tubes filled | | 276 |
| | 10C | " | | | — | 600 | " | A | | 6, 12, 13, 14 | | 263(4a) |
| 810206 | 11 | 0.5/1 P1 | 810015 | NW | 5 | 550 | X O | — | — | 3, 5, 6, 7, 8, 9, 10, 15 empty | B | 173 |
| 810207 | 12A | " | " | " | 5 | 1200 | X O | — | — | | B | — |
| | 12B | " | " | " | — | 1200 | X O | — | 2 | 6, 10, 11, 12, 15 empty | — | 228 |
| 810208 | 13 | 0.5/1 P2 | 810017 | NW | 5 | 1200 | none | none | 1 | 11, 13 empty | B | 348 |
| 810209 | 14A | " | " | " | 5 | 1200 | X O | " | | five tubes empty | B | — |
| | 14B | " | " | " | " | 700 | X O | " | | three tubes empty | B | 313 |
| | 14C | " | " | " | " | 1500 | X O | " | 3 | 6, 8, 9 empty | — | — |
| 810210 | 15 | " | " | " | 3 | 1200 | Y O | none | 1 | all tubes filled | B | 355 |
| 810106 | 16A | 0.56/1 N | 810004 | " | 2 | 400 | Y O | | | 13, 14, 15 empty | B | — |
| | 16B | " | " | " | — | 100 | Y O | A1 | — | — | — | — |
| | 16C | " | " | " | — | 200 | Y O | A1 | 3 | — | — | 283 |
| 810107 | 17 | 0.46/1 N | 810005 | NW | 3 | 1500 | Y O | — | 1 | 14, 15 empty | B | 311 |
| 810108 | 18 | " | " | " | 2–5 | 500 | Y | — | 1 | all tubes filled slight pelletization at 1, 2 and 3 (2a) | B | 359 |
| 810109 | 19A | 0.46/1 N | 810005 | NW | 2–5 | 1500 | Y O | — | | 8, 13, 14, 15 | B | 270 |
| | 19B | " | " | " | — | 1500 | Y O | — | 2 | 8(½ full), 13, 15, empty | — | 298 |
| 810110 | 20 | 0.25/1 N | 810006 | " | 5 | 1500 | Y O | A2 | 1 | 15 empty | B | 309 |
| 810111 | 21 | " | " | " | " | 1500 + 1500 | Y O | A2 | 1 | all filled | B | 336 |
| 810112 | 22A | 0.75/1 N | 810007 | " | " | 1500 | Y O | — | | tubes blocked | B | 236 |
| | 22B | " | " | " | — | " | Y O | A2 | 2 | 8, 9, 14, 15 empty | B | 278 |
| 810113 | 23 | " | " | " | 5 | " | Y O | A2 | 1 | 4, 11, 13 empty 12 (½ full) 14 (½ full) | B | 258 |

After these experiments heavy blocking of the manifold with large graphite particles was found to be occurring despite washing down of the air injection leg 108 and the manifold. It was thus decided to screen out a proportion of the largest particles.

TABLE 3

| Example | Active material | Solids liquids | Expt. Ref. | Stratification Top D | middle C | B | bottom A | A – D | Mean | % deviation |
|---|---|---|---|---|---|---|---|---|---|---|
| 18 | Negative | 0.46/1 | 810108 | 161 | 164 | 169 | 175 | 14 | 167 | +5 –4 |
| 21 | " | 0.25/1 | 810111 | 156 | 158 | 162 | 165 | 9 | 160 | +3 –2.5 |
| 22B | " | 0.75/1 | 810112 | 163 | 156 | 162 | 161 | –2 | 160 | +2 –2.5 |
| 13 | Positive 2 | 0.5/1 | 810208 | 168 | 164 | 165 | 158 | –10 | 164 | +2.5 –4 |
| 10C | Positive 1 | 0.5/1 | 810205 | 173 | 154 | 153 | 133 | –40 | 153 | +13 –13 |

Comparison of the results obtained in Table 3 for Examples 10C and 13 demonstrate the much improved evenness of filling obtained by using screened positive active material (all particles less than 500 microns).

Comparison of Examples 13 and 14 with Example 15 indicate the superior filling weight obtained by use of the modified air diffuser 116 in the manifold.

Notes on tables 1, 2A–2D, 3 and 4

1. The symbol A2 indicates that air pressure was applied to the solids in the plate by closing the valve 102 allowing pressure to build up, venting the pressure and allowing the manifold to fill with slurry again for two such cycles; A1 indicates that only one such cycle was used.

2. The tubes are numbered from 1 to 15 starting at the lug end.

2a. Reference is made to pelletization in connection with Example 18. This means that small pellets of active material extended out beyond the open ends of the tubes it is an indication of tendency to a change from type B to type A filling.

3. The symbol O indicates that the air hose was oscillated up and down.

4. Wet paste in plate — The weight x of the fabric tube the lead spines and a bottom bar was measured. The values quoted are the wet filled plate after bottom-baring minus x.

4a. This value is lower than the previous value this is thought to be due to displacement of some of the water from the wet solids by the air pressure.

5. % Settlement of the sample — This is the height A of the solids in the container divided by the height B of the liquids from the bottom of the container expressed as a percentage after the sample had been thoroughly shaken for ½ minute and then allowed to settle in a vertical position for 24 hours.

The container is a round bottomed test tube of 1.5 cms internal diameter and at least 9 cms of slurry are placed in the test tube.

6. ½ life of the suspension — This is the time taken for the solids level of the sample in the container described under 5) above to sink to halfway between B and A.

The test is carried out by placing a rubber band with its bottom edge at the halfway level i.e. (B + A)/2 cms from the bottom of the test tube, shaking the tube vigorously for at least ½ minute or until all the solids are displaced from the bottom of the test tube and then righting the test tube and measuring the time from that instant to the instant when light is first visible under the rubber band.

7. Stratification. — (Table 3) This is determined after drying the plates at 70° C for 24 hours.

The top bar and the bottom bar were then cut off the plate and the remainder cut into four equal horizontal strips labelled A B C and D with A at the bottom bar end of the plate. These were then weighed.

8. Torque values — The rotating vane viscometer values for certain of the slurries used in the above examples are given above in Table 1.

The viscometer used is illustrated in FIGS. 6, 7 and 8.

The apparatus consists of a frame 110 carrying an electric motor 111 driving a paddle assembly 120 via a gear box 112 and a torque transducer 119. The speed in the gear box 112 is sensed by a tachogenerator 113 the output of which is fed to a digital voltmeter 113A. The voltage signal produced by the torque transducer is fed to a chart recorder 114. The recorder has a variable chart speed and a variable scale.

A sample container 130 is clampably supported on an adjustable table 115 which can be raised and lowered on guides 116 by a pneumatic cylinder 117.

The sample container 130 has a detachable lid 131 located above the paddle assembly 120. The lid can be secured to the container by an external bayonet lock (not shown).

The paddle assembly 120 is removably attached to the output shaft 118 of the gear box 112, and consists of a central rod 121 having a lower boss 122 which in use nests in a hole 132 in the bottom of the container 130. The rod 121 has a diameter D5 of 1.3 cms and carries three pairs of paddles 123, 124 and 125. The paddles 123 and 125 are in the same plane and are at right angles to the paddles 124. All the blades of the paddles are vertical and thus parallel to the axis of the rod 121. The paddles are carried on arms 126, 127 and 128. The distance D6 from the centre of the arm 126 to the boss 122 is 6.5 cms, the distance D7 from the centre of the arm 127 to the boss 122 is 3.9 cms and the distance from the centre of the arm 128 to the boss 122 is 1.6 cms. The width of each paddle D3 is 1.2 cms and its height D2 is 1.2 cms and its thickness 0.1 cm. The distance D4 from the inside edge of each paddle to the surface of the rod 121 is 1.5 cms.

The distance D1 between the outside edges of the paddles in a pair of paddles is 6.8 cms.

The internal height of the container 130 is 8.2 cms and its internal diameter is 8.8 cms. There are four internal baffles 135 located at the ends of diameters at right angles to each other. The thickness D10 of each baffle 135 is 0.30 cms and its inward extent D9 is 0.5 cms. The separation D11 of the baffles on a diameter is 7.65 cms. Each baffle extends the full height of the container.

The container and baffles are made of smooth stainless steel.

The apparatus is used as follows:

The container is filled to a depth of 8.2 cms with the material under test and raised into position, clamped to the table 115 and the lid 131 secured.

The chart recorder 114 is started and the motor 111 is then started with the gearing set for a low shear rate e.g. 6 rpm. The start up torque and steady state torque are detected by the torque transducer 119 and the motor and recorder run until a steady torque value has been recorded for at least 2 minutes. This is the steady state torque value. The torque value at the steady state is quoted and if an initial peak was present this fact is noted. The sample is then removed, shaken with the bulk of the material being measured and the container refilled. The measurement is then repeated at a higher shear rate e.g. 18 rpm. The cycle is repeated for as many shear rates as desired.

The background torque value namely with the container 130 empty was found to be 0.002 lbs ft at all the shear rates quoted in Table 1. The value obtained when the container was filled with water was 0.002 lbs ft.

The rotating vane viscometer torque value as defined herein is the value of the steady state torque value of the sample measured in the above described manner on the above described machine at a shear rate of six revolutions of the paddles per minute at ambient temperature of 20° C minus the background value at 20° C. Tests on the plates of Examples 1 to 23 indicated the generation of electrical energy.

Examples 24

Examples will now be given of specific plate production techniques using the apparatus of FIGS. 14 and 15.

Certain of the Examples used the same plates as are described above for Examples 1 to 23, that is using non woven polyester sheaths consisting of 15 tubes joined to each other and a cast lead spine assembly. These are identified by the letters NW in tables 4A to 4C below.

Other Examples used the same cast lead spine assembly but a different sheath arrangement consisting of 15 separate individual tubes. Each tube has a perforated external polyvinyl chloride sheath and an internal woven glass fibre fabric in the form of a tube.

These are identified by the letters PG in tables 4A to 4C below.

Each such tube has an external continuous PVC sheath 2.9 cm in circumference, with seven holes arranged around its circumference and a length of 2.9 cm along the axis of the sheath also contains seven holes. The holes are thus arranged on square centres, but are displaced from each other by 45° so that lines of holes precess around the circumference of the tube at an angle of 45°. Each hole is 2mm in diameter and the internal diameter of the polyvinyl chloride sheath is 9mm. The thickness of the sheath is about 0.2mm.

Located within the tube is a glass fibre, continuous, seam free tube made of staple threads, themselves of flat cross section and about 0.5mm width, themselves formed of staple glass fibres 1 - 2 cms long. The threads are woven at about 45° diagonally along the length of the tube, there being 60 separate threads each of which is formed from two thinner threads twisted together at a shallow pitch of about five twists per cm. The individual threads are themselves about 0.3mm across and are very flat being about 0.05mm thick. The internal volume of the sheathed plates, marked PG, free to be filled with active material is 270cc.

TABLE 4

| Item 1 | Item 2 | Item 3 | Item 4 | Item 5 | Item 6 | Item 7 | Item 8 | Item 9 | Item 10 | Item 11 | Item 12 | Item 13 | Item 14 | Item 15 |
|---|---|---|---|---|---|---|---|---|---|---|---|---|---|---|
| 411100 24 | .21/1 | 41101 NH2 | NW | 12 | 20 | 24 | 12 | Yes | None | B | 310 | 137 | 56L/min | 30L/min |
| 411101 25 | .20/1 | " | " | 22 | 20 | 42 | 20 | Yes | " | " | 309 | 141 | " | 20 |
| 411102 26 | .40/1 | 41102 | " | 6 | 20 | 7.5 | 1.5 | No | 10 12(½) | " | 317 | 148 | 72 | — |
| 411103 27 | .39/1 | " | " | 5 | 20 | 6.5 | 1.5 | Yes | None | " | 319 | 185 | " | 40 |
| 411104 28 | .37/1 | " | " | 4 | 31 | 8.5 | 4.5 | No | " | " | 293 | 141 | " | 30 |
| 411105 29 | .36/1 | " | " | 4 | 30 | 10 | 6 | Yes | 13 | " | 280 | 148 | " | 30 |
| 411110 30 | .37/1 | 41110 NM3 | " | 4 | 20 | 8 | 4 | " | None | B | 342 | 207 | " | " |
| 411111 31 | .28/1 | " | " | 4 | 30 | 11 | 7 | " | " | BA | 280 | 125 | " | " |
| 411112 32 | .26/1 | " | " | 8 | 20 | 12 | 4 | " | " | " | 269 | 122 | " | " |
| 411113 33 | .14/1 | " | " | 14 | 20 | 25 | 11 | " | " | B | 320 | 150 | " | " |
| 411114 34 | .12/1 | " | " | 26 | 10 | 46 | 20 | " | " | B | 305 | 131 | " | " |
| 411200 35 | .25/1 | 41201 | " | 9 | 10 | 23 | 14 | " | " | " | 419 | 225 | " | " |
| 411201 36 | .21/1 | " | " | 18 | 0 | — | — | " | " | " | 375 | 180 | " | " |
| 411202 33 | .20/1 | " | " | 14 | 12 | 24 | 10 | " | | " | 420 | 217 | " | " |
| 411203 38 | 0.67/1 | 41202 NO1 | NW | 8 | 20 | 12 | 4 | Yes | None | B | 462 | 278 | 72L/min | 30L/min |
| 411204 39 | 0.45/1 | " | " | 10 | 14 | 21 | 11 | " | " | B | 435 | 258 | " | " |
| 411206 40 | 0.42/1 | 41203 | " | 6 | 10 | 18 | 12 | " | " | BA | 448 | 300 | " | " |
| 411207 41 | 0.31/1 | " | " | 4 | 20 | 7 | 3 | " | " | A | 382 | 217 | " | " |
| 411208 42 | .50/1 | 41208 | PG | 4 | 4 | 37 | 33 | " | 2(¾) | B | 550 | 379 | " | " |
| 411209 43 | .45/1 | " | " | 45 | — | — | — | " | None | AB | 442 | 257 | " | " |
| 411210 44 | .44/1 | 41210 | " | 29 | — | — | — | " | " | A | 382 | 177 | " | " |
| 411211 45 | .41/1 | 41211 | " | 10 | 1 | 16 | 6 | " | " | A | 426 | 243 | " | 45 |
| 411212 46 | .39/1 | " | " | 10 | 6 | 22 | 12 | " | " | A | 417 | 217 | " | 55 |
| 411213 47 | .35/1 | " | NW | 10 | 14 | 28 | 12 | " | " | A | 337 | 201 | " | " |
| 411214 48 | .34/1 | " | " | 4 | 30 | 22 | 18 | " | " | A | 333 | 198 | " | " |
| 411215 49 | .33/1 | " | " | 10 | 10 | 52 | 42 | " | " | A | 320 | 191 | " | " |
| 511000 50 | .25/1 | 51000 511PGS | NW | 12 | 20 | 26 | 14 | " | 4 | B | 342 | 200 | " | " |
| 511001 51 | .23/1 | " | PG | 24 | — | — | — | " | all empty | B | 200 | 97 | " | " |
| 511002 52 | .51/1 | | NW | 8 | 20 | 16 | 8 | Yes | None | B | 388 | 245 | 72 | 55 |
| 511003 53 | .48/1 | | PG | 14 | — | — | — | " | 4 | " | 412 | 239 | " | 15 |
| 511004 54 | .46/1 | | " | 16 | — | — | — | " | 7 | " | 385 | 224 | " | " |
| 511005 55 | .40/1 | 51005 NH2 | " | 10 | 20 | 20 | 10 | " | None | " | 375 | 188 | " | " |
| 511006 56 | .36/1 | " | " | 10 | 10 | 18 | 8 | No | " | " | 395 | 186 | " | None |
| 511007 57 | .35/1 | " | " | 10 | 20 | 20 | 10 | Yes | " | " | 401 | 193 | " | 30 |
| 511008 58 | .35/1 | " | NW | 8 | 20 | 13 | 5 | " | " | " | 345 | 170 | " | 30 |
| 511009 59 | .34/1 | " | PG | 10 | 15 | 25 | 15 | " | " | " | 399 | 192 | " | 30 |

| | |
|---|---|
| Item 1 | Example |
| Item 2 | Solids/Liquids |
| Item 3 | Slurry Reference |
| Item 4 | Type of Tube |
| Item 5 | Time to start of pressure rise secs. $T_1$ |
| Item 6 | Pressure rise to shut off p.s.i. |
| Item 7 | Total time to shut off secs. $T_2$ |
| Item 8 | Time for which pressure applied secs. $T_2 - T_1$ |
| Item 9 | Air injection |
| Item 10 | Tubes empty the tubes are numbered 1 to 15 |

TABLE 4-continued

| Item 1 | Item 2 | Item 3 | Item 4 | Item 5 | Item 6 | Item 7 | Item 8 | Item 9 | Item 10 | Item 11 | Item 12 | Item 13 | Item 14 | Item 15 |
|---|---|---|---|---|---|---|---|---|---|---|---|---|---|---|

Item 11  starting at the lug end
Filling appearance
Item 12  Wet paste in plate grams
Item 13  Dried paste in plate grams
Item 14  Slurry tank air stirrer 255 litres of air per minute
Item 15  Air injection 258

A pump setting of 110 corresponding to 5 liters of water per minute was used in all these examples. Tables 5A and 5B below give details of the viscosity, % settlement and suspension half lives of the slurries used in these examples.

The viscosity values quoted herein are used to characterise the slurries as being readily pourable and of low viscosity. The values quoted in Tables 1, 5A and 5B are the observed values and are not the torque values (as defined herein) which are used to characterise the preferred slurries. It will be appreciated that to convert the observed torque values of Table 1 to the torque values (as defined herein) the background value of 0.002 should be subtracted from the observed values, and for Tables 5A and 5B the background of 0.001 should be subtracted. Certain examples, 41101, 41201, in Table 5A, 41210, 51000, and 51005 in Table 5B and 810017 in Table 1 have values the same as the background value. Thus their observed torque value is not greater than the background value in the measurement carried out and they fulfil the preferred viscosity characteristic of having a torque value (as defined herein) of less than 0.006 lbs. ft. at 20° C.

NH2 is a negative active material containing by weight 78% cadmium hydroxide $Cd(OH)_2$, 5% cadmium, 15% iron oxide $Fe_2O_3$, and 2% graphite.

NH3 is the NH2 material after sieving to remove particles greater than 40 mesh.

NO1 is 100% by weight cadmium oxide.

511 PGS is a material made from positive 1 described above.

Positive 1 was sieved, 5950 grams passing a 40 mesh sieve. The material which did not pass this sieve was ground in a ball mill for 16 hours. This ground material was then sieved and 450 grams of the material which passed a 40 mesh sieve were combined with 5950 grams which passed in the first sieving.

The particle size analyses for these materials are given in table 6 below.

TABLE 6

| Active material | | | | | |
|---|---|---|---|---|---|
| Mesh size | Micron Size | NO1 | NH2 | NH3 | 511 PGS |
| >16 | >1000 microns | 0 | 0 | 0 | 0 |
| <16 | <1000 | 100 | 100 | 100 | 100 |
| <22 | <699 | 100 | 95 | 100 | 100 |
| <30 | <500 | 100 | 81 | 100 | 100 |
| <60 | <250 | 98 | 60 | 90 | 94 |
| <100 | <150 | 34 | 41 | 66 | 77 |
| <150 | <105 | 28 | 33 | 64 | 67 |
| <350 | <45 | 7 | 6 | 9 | 20 |

TABLE 5

| Slurry reference number | Used in Example | Active Material | Solids Liquids | Shear rate r.p.m. | Torque lbs ft | Presence of Peak | % Settlement of example | Suspension half life |
|---|---|---|---|---|---|---|---|---|
| 41101 | 24 | NH2 | 0.21/1 | 6 | 0.001 | none | 38% | 7 secs |
| | | | | 24 | 0.001 | | | |
| | | | | 42 | 0.001 | | | |
| 41102 | 26 | | 0.40/1 | 6 | 0.003 | none | 93% | — |
| | | | | 24 | 0.001 | | | |
| | | | | 42 | 0.001 | | | |
| 41110 | 30 | NH3 | 0.37/1 | 6 | 0.002 | none | 93% | — |
| | | | | 24 | 0.001 | | | |
| | | | | 42 | 0.001 | | | |
| 41201 | 35 | NO1 | 0.25/1 | 6 | 0.001 | none | 74% | 8 mins 45 secs |
| | | | | 24 | 0.001 | | | |
| | | | | 42 | 0.001 | | | |
| 41202 | 38 | NO1 | 0.5/1 | 6 | 0.003 | none | 95% | — |
| | | | | 24 | 0.003 | | | |
| | | | | 42 | 0.003 | | | |
| 41203 | | NO1 | 0.67/1 | 6 | 0.014 | none | 100% | — |
| | | | | 24 | 0.014 | | | |
| | | | | 42 | 0.014 | | | |
| 41208 | | NO1 | 0.5/1 | 6 | 0.006 | none | 91% | — |
| | | | | 24 | 0.006 | | | |
| | | | | 42 | 0.006 | | | |
| 41210 | | NO1 | 0.5/1 | 6 | 0.001 | none | 88% | — |
| | | | | 24 | 0.004 | | | |
| | | | | 42 | 0.004 | | | |
| 41211 | | | | 6 | 0.009 | none | 96% | — |
| | | | | 24 | 0.013 | | | |
| | | | | 42 | 0.014 | | | |
| 51000 | | 511 PGS | 0.25/1 | 6 | 0.001 | none | 20% | 41 secs |
| | | | | 24 | 0.001 | | | |
| | | | | 42 | 0.003 | | | |
| 51005 | | NH2 | 0.4/1 | 6 | 0.001 | none | 97% | — |
| | | | | 24 | 0.001 | | | |
| | | | | 42 | 0.002 | | | |

The background torque value for the results in Tables 5A and 5B was 0.001 lbs. ft.

The active material compositions used in the slurries had the following compositions and sieve analyses.

The electrical performance of test cells made up with certain of the plates made in Examples 24 onwards were tested as follows.

Plates made with negative NH2 or NH3 active material namely those of Examples 26, 27, 30 and 33 were soaked in the test cell in 1.20 specific gravity potassium hydroxide (KOH) at 20° C for 16 hours.

The capacity $C_{est}$ was estimated from the dry weight of active material in the cell. The plates were charged for 14 to 16 hours at a current in amps of $C_{est}/10$ so that about 150% of the capacity $C_{est}$ was supplied to the cell.

The cell consisted of two conventional standard plates with the experimental negative plate hung between them and spaced from them by 3 to 5 mms and a piece of alkali resistant polymer net about 0.5 mm thick was located in each such gap. The openings in the net are about 2-3 mms across. The cells were tested by being discharged at a current in amps of $C_{est}/5$ at 20° C.

The results of two different discharge regimes are given in tables 7A and 7B below.

Certain of the plates made with NO1 Cadmium oxide active material namely Examples 38 and 47, were soaked in KOH and charged as above, others, Examples 48 and 49, were soaked in 20g/ml aqueous nickel sulphate solution at 20° C for 16 hours and then rinsed in water and allowed to drain for 5 minutes. They were then immersed in 1.20 specific gravity KOH and then charged as above.

conductivity; preferably 5 to 15% by weight of graphite is used. Steel may be used as the current collecting element and can also be used as the envelope for the active material in a suitale porous form to enable the filtration filling to be achieved. Other alkaline electrochemically active materials include iron oxide for the negative active material.

The nickel hydroxide may also have nickel particles or flakes distributed through it to enhance its conductivity. The iron oxide may also have conductive materials incorporated in it to improve its conductivity.

The electrolyte is typically aqueous potassium hydroxide which may contain a small proportion of lithium hydroxide.

The invention in enabling chemically inert envelopes to be used does not preclude the filling of the tubes with metallic or other forms of the active materials and their chemical or electrolytic conversion to electrochemically actitve form within the envelope and thus in it broadest aspect includes such an arrangement. The term active material composition thus includes materials capable of being converted to electrochemically active form within the porous envelope either before assembly into the cell or after assembly into the cell.

An example of this aspect of the invention is the use of cadmium oxide (CdO) instead of cadmium hydroxide (Cd(OH)$_2$) in the negative slurry. CdO is more dense than Cd(OH)$_2$ and thus a greater weight can be intro-

TABLE 7

| | | | Capacity Obtained to 1 Volt | | | | | | |
|---|---|---|---|---|---|---|---|---|---|
| | | | Cycle 1 | | Cycle 3 | | Cycle 8 | | |
| Plate Ref | Example | Calc. C AH | AH | % of $C_{est}$ | AH | % of $C_{est}$ | AH | % of $C_{est}$ | Active Material |
| 411102 | 26 | 28 | 0.9 | 3 | 5.2 | 19 | 15.7 | 56 | NH2 |
| 411103 | 27 | 35 | 1.2 | 3.5 | 4.9 | 14 | 14.4 | 41 | NH2 |
| 411110 | 30 | 39 | 1.8 | 4.6 | 8.0 | 20 | 19.2 | 49 | NH3 |
| 411113 | 33 | 28 | 1.2 | 4.3 | 6.9 | 25 | 16.6 | 59 | NH3 |
| 411203 | 38 | 73 | 28.5 | 39 | 23.5 | 32 | 40.7 | 56 | NO1 |
| 411213 | 47 | 53 | 24.6 | 46 | 18.5 | 35 | 17.4 | 33 | NO1 |
| 411214 | 48 | 52 | 18 | 35 | 27.3 | 52 | 23.7 | 46 | NO1 |
| 411215 | 49 | 50 | 18.7 | 37 | 29.2 | 58 | 23 | 46 | NO1 |

TABLE 7 B

| | | | Capacity Obtained to zero volts | | | | | | |
|---|---|---|---|---|---|---|---|---|---|
| 411102 | 26 | 28 | 4.6 | 16 | 13.4 | 48 | 30 | 107 | NH2 |
| 411103 | 27 | 35 | 4.1 | 12 | 11.2 | 32 | 27.8 | 80 | NH2 |
| 411110 | 30 | 39 | 3.8 | 9.7 | 14.2 | 36 | 28.9 | 74 | NH3 |
| 411113 | 33 | 28 | 3.2 | 11 | 12.2 | 44 | 25.3 | 90 | NH3 |
| 411203 | 38 | 73 | 41.5 | 57 | 40.5 | 55 | 47.4 | 65 | NO1 |
| 411213 | 47 | 53 | 33.8 | 68 | 28.8 | 54 | 30.2 | 57 | NO1 |
| 411214 | 48 | 52 | 26 | 50 | 37.6 | 72 | 35.2 | 68 | NO1 |
| 411215 | 49 | 50 | 26 | 52 | 36.2 | 73 | 34.5 | 69 | NO1 |

It has been mentioned above that other electrochemically active materials besides nickel cadmium alkaline active materials can be used with the process of this invention.

Clearly the components used in such alternative arrangements must be compatible with each other. Thus, for example, when alkaline negative active materials are to be used the spines should be made of a metal having adequate chemical corrosion resistance to the alkaline environment, e.g. steel current collecting spines of round or strip section could be used, and these may be nickel plated and the polyester fabric tubes could be replaced by polyamide, e.g. nylon, fabric tubes. Preferred examples of alkaline electrochemically active materials include nickel hydroxide for the positive plate and cadmium hydroxide for the negative plate. These typically contain a proportion of electrically conductive material, e.g. graphite sufficient to ensure adequate duced into a given tube volume. The CdO can be converted to the active form Cd(OH)$_2$ by immersion in Nickel nitrate or nickel sulphate when the dense brown CdO powder is converted to a greyish white sludge by an as yet imperfectly understood reaction which is thought possibly to be a hydrolysis reaction.

Many other electrochemically active couples exist which have been proposed for use in batteries.

The process has been described with reference to secondary or rechargeable systems so far. It is, however, equally applicable to primary battery systems where the active materials or one of them can be enclosed in a porous envelope and can be introduced into the envelope as a liquid suspended, preferably aqueous, slurry.

The liquid used as the suspension agent in the slurry is most readily aqueous and this is clearly preferred on grounds of cost, safety and inertness. However, if an aqueous vehicle would introduce problems it could be replaced by any other liquid vehicles appropriate to the active material being used.

Examples of other battery systems with which the process could be used are thus listed in the following Table 8.

The active materials listed below would be used in particulate form of particle size appropriate to achieve filtration filling with the porous envelope which would be used.

Instead of a helix, a zig zag arrangement could be used. Preferably the ratio of the pitch of the helix to its external diameter is about 1:1, e.g. 0.5:1 to 2 or 3:1.

In an alternative embodiment a current collecting element or elements external to, and preferably surrounding, the porous envelope may be used.

In such cases the porous envelope must be provided with sufficient current conducting capability itself. Thus it could be a metal mesh or fabric or non woven material such as steel wool or a metallized non metallic fabric. Alternatively it could be impregnated with a

TABLE 8

| Battery System | Positive Electrode | Negative Electrode | Electrolyte | Primary or Secondary | Comments |
|---|---|---|---|---|---|
| A | Zinc | Carbon | Ammonium chloride or potassium hydroxide | Primary | |
| B | Zinc | Carbon catalysed with noble metals or base metals such as copper | " | " | |
| C | Zinc | Manganese oxide/carbon blends with a carbon current collector rod | Ammonium chloride | " | |
| D | Zinc | " | Potassium hydroxide | Secondary | |
| E | Zinc | Graphite catalysed with noble metals or base metals such as copper | " | Primary | Air is passed through the negative electrode where it is ionized |
| F | Iron | As in E | As in E | As in E | As in E |
| G | Cadmium | " | " | " | " |
| H | Magnesium | Manganese dioxide/carbon blends with carbon current collector rod | Potassium hydroxide Potassium chromate Potassium chlorate | " | |
| I | Mercurous oxide (HgO) | Cadmium oxide (CdO) | Aqueous potassium hydroxide | " | |
| J | Nickel | Graphite catalysed with noble metals or base metals such as copper | Potassium hydroxide | Secondary | The electrodes are housed in a sealed container which is saturated with hydrogen gas. The electrodes use up hydrogen during discharge and give off hydrogen during charge |

The invention in its broadest aspects extends to novel alkaline electric storage battery electrodes, to cells including these electrodes and to alkaline electric storage batteries made from such cells.

Thus according to another aspect of the invention an alkaline electric storage battery electrode comprises a porous envelope enclosing within it particulate active material which is electrochemically active under alkaline conditions and the porous envelope is one which is capable of filtering out a bed of active material from an aqueous slurry of the active material contaning 0.5 parts of the active material per part of water.

The electrode preferably has an internal current collecting element or elements connected to an external current take off terminal for the plate. Some suitable forms of such current collecting element have already been described above. One alternative form of internal current collecting element is a wound helix of wire, the external diameter of the helix being equal to or slightly less than e.g. 80% to 100% of the internal diameter of the tubes if a tubular envelope is being used or slightly less than the internal thickness of the pocket if a flat pocket envelope is being used. Thus, in general, the current collecting element in this arrangement can provide both a current collecting function and an envelope supporting function and accordingly may be arranged in any way effective to achieve at least the former, and preferably both, functions.

conductive particulate material, e.g. graphite.

One suitble metallized non metallic fabric would have the following characteristics.

It would desirably have an air permeability (as herein defined) of about $11 \times 10^4$ liters/square meter/ second, air permeability being measured as follows:

A sample of 6.16 sq. cms. cross section area would be clamped in position and the time for 10 liters of dry air to flow through the sample at 20° C under a pressure difference of 1 meter of water would be recorded.

It would desirably weigh 0.01 to 0.02, e.g. 0.07 to 0.10 grams/square cm. and would be 1 to 3, e.g. 2.5 mm thick.

It would desirably be a needle punched bicomponent web of alkali resistant fibres, e.g. nylon fibres. The fibres would be in general, individually well in excess of 500 microns in length and would typically be 1 to 3 cms long and 20 to 30 microns in diameter. It would desirably not have been subjected to any fusion step and thus the fibres would not be fused to each other.

The fibres would have substantial areas of coating along their lengths, though these need not be complete coatings. There would desirably also be accretions of material at or adjacent the intersections of fibres with each other.

These coatings and accretions could be of any appropriate conductive material, e.g. a metal such as nickel.

The material would desirably contain about 0.01 to 0.20, e.g. 0.05 grams of metal/square cm.

The fabric would be made by forming a mat of bicomponent fibres, e.g. by air laying or carding techniques and then subjecting the mat to needle punching so as to entangle the fibres.

The porous envelope may be a non metallic alkali resistant fabric, e.g. non woven fabric, and preferably that described above and identified as N.W. However, the envelope can also be formed in two parts, one an outer strength imparting coarsely porous e.g. perforated retainer, and the other an inner finely permeable filtration layer.

The two layers may be attached or bonded to each other if desired, by either a permanent or fugitive attachment such as a water or alkali soluble glue.

The outer retainer is preferably metallic so as to be capable of holding the active material, especially in the negative plate, in tightly compressed form.

If the filtration layer is not to be rendered conductive or is not intrinsically conductive it will be preferably to use an internal current collecting element or elements.

An example of this form of electrode would be as follows:

The outer retainer is a flat box of perforated steel mesh having an open top and bottom end. The perforations are at least 8 thou across, e.g. 10 or 15 to 20 or 30 thou. Located within the box is a glass fibre filter liner preferably having a permeability of the order defined above.

The internal current collecting element is a stamped metal comb or perforated metal sheet, e.g. of steel or lead, which may be nickel coated and, when lead, could be cast.

The element preferably has shoulders on its top and bottom end and tags extending out beyond each end and arranged to pass through slots in plastics end plugs, e.g. of nylon, which are force fits in the ends of the metal box. The tags are then bent over and secure the box together. A terminal is also formed on the comb to extend up through the top end plug. The bottom end of the element may have ears extending out sideways to engage slots in the end of the metal box so as to centre the element during filling.

The box could be filled from the open bottom end as described above for tubular plates, and the bottom plug then inserted. A slot type filling head as described above could be used.

The box could be assembled in a continuous process by attaching a continuous sheet of the filter material to one face of the metal retainer and then folding the box to shape as a continuous tube, welding it and then shearing it to the desired length.

In a further modification of the method, the supply of slurry is from an enclosed pressure accumulator tank provided with a valved slurry inlet and a valved air pressure supply line. Two or more such supply tanks could be provided connected to a common inlet to the manifold by valved pipes so that, if desired, layers of differing composition could be laid down in sequence in the tubes, e.g. active material layers followed by layers having higher concentrations of conductive material such as graphite. Such an arrangement would enable the slurry to be supplied without use of a pump which can wear in contact with the slurry and could also be used to achieve pressure build up to the desired level in the slurry supply.

In a further modification a pair of impermeable plates conforming to the external profiles of the sheathed tubes are also provided so that they can be clamped over the plates and then readily removed again. These plates have vents at their bottom ends. This would allow the tubes to be partially filled, the impermeable clamps would then be secured in place and the air pressure built up to consolidate the partially formed bed by forcing the solids into a compact bed at the bottom of the tube, the liquids issuing through the vents in the impermeable clamps. This sequence of partial fill, clamp and consolidate could be repeated at whatever frequency was desired until the plates were full.

In a further modification of the filtration filling method a diffused supply of air or gas is provided to the interior of the manifold so as to reduce settlement of solids therein before they enter the enveloped plates. Preferably the air flow is in the range of 2 to 15 liters per minute through an 0.5 cm diameter tube. The air flow preferably has components of flow extending out at an angle of at least 30° and preferably 60° to 90° to the longitudinal axis of the main air flow.

What we claim as our invention and desire to secure by letters patent is:

1. A method for preparing enveloped plates for batteries by introducing an active material composition containing liquids into the porous envelope of the plate, when the envelope is assembled on the current conducting element of the plate, characterized by using an active material composition which is an alkaline active material composition wherein the composition is introduced into said envelope as a slurry having a rotating vane viscometer torque value of less than 0.006 lbs. ft. at 20° C, and after the envelope has filled, the back pressure in the supply of slurry to the envelope is allowed to build up to a pressure above 5 p.s.i. but not in excess of 100 p.s.i. and the pressure thereafter being released.

2. A method of filling enveloped plates for batteries which comprises introducing an active material composition into the porous envelope of the plate, when the envelope is assembled on the current conducting element of the plate, characterized in that the active material composition is an alkaline active material composition introduced into the envelope as an aqueous slurry having a rotating vane viscometer torque value of less than 0.006 lbs. ft. at 20° C, wherein the envelope is disposed in a substantially vertical plane so that solids can settle to the bottom of the envelope under gravity, the aqueous slurry containing a ratio of active material to water in the range 0.1:1 to 1.5:1 in parts by weight, the material of the envelope being selected to filter out active material whilst allowing passage of liquids, the solids being at least partially retained within the envelope and the liquids at least partially passing out through the walls of the envelope, the introduction of the slurry into the envelope being continued until the envelope is filled with active material, the pressure in the supply to the envelope then being allowed to rise to a value above 5 p.s.i. but not in excess of 100 p.s.i. and the pressure thereafter being released.

3. The method of claim 1 in which the envelope is an array of tubes arranged side by side with a current conducting element located in each tube.

4. The method of claim 3 in which the ratio of the volume of slurry which is fed into the tubes to the total internal free volume of the tubes in the plate is at least 2:1.

5. The method of claim 4 in which said ratio of the volume of slurry is between 3:1 and 15:1.

6. The method of claim 2 in which after the envelope has filled, the back pressure in the supply of slurry to the envelope is allowed to build up to a pressure in the range 5 to 50 psi.

7. The method of claim 2 in which the material of the envelope has a nitrogen permeability in the range 0.5 to 20 liters/sq.cm/min.

8. The method of claim 2 in which the slurry composition comprises cadmium hydroxide active material containing 70% to 90% cadmium hydroxide, up to 10% cadmium, up to 5% graphite and up to 15% iron oxide, the ratio of solids to liquids being in the range 0.25:1 to 0.75:1.

9. The method of claim 1 in which the alkaline active material comprises nickel hydroxide with up to 20% by weight of graphite and the solids to liquids ratio in the slurry is in the range 1.5:1 to 0.2:1.

10. An alkaline electric storage battery electrode comprising a porous envelope enclosing within it particulate active material which is electrochemically active under alkaline conditions, the porous envelope being one which is capable of filtering out a bed of active material from an aqueous slurry of the active material containing 0.5 parts of the active material per part of water wherein the active material has been filled by the method of claim 1.

11. The electrode of claim 10 wherein an internal current collecting element is connected to an external current take-off terminal.

* * * * *